United States Patent
AbdelHady et al.

(10) Patent No.: US 12,175,968 B1
(45) Date of Patent: Dec. 24, 2024

(54) SKILL SELECTION FOR RESPONDING TO NATURAL LANGUAGE INPUTS

(71) Applicant: Amazon Technologies, Inc., Seattle, WA (US)

(72) Inventors: Mohamed Farouk AbdelHady, Redmond, WA (US); Qian Hu, Seattle, WA (US); Mohamed Thahir Peer Mohamed, Bellevue, WA (US); Wei Xiao, Seattle, WA (US); Zheng Gao, Sammamish, WA (US); Radhika Arava, Bellevue, WA (US); Xibin Gao, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 214 days.

(21) Appl. No.: 17/213,492

(22) Filed: Mar. 26, 2021

(51) Int. Cl.
*G10L 15/18* (2013.01)
*G06F 16/33* (2019.01)
(Continued)

(52) U.S. Cl.
CPC ...... *G10L 15/1815* (2013.01); *G06F 16/3344* (2019.01); *G06N 3/08* (2013.01);
(Continued)

(58) Field of Classification Search
CPC ..... G10L 15/1815; G10L 15/02; G10L 15/22; G10L 2015/227; G06F 16/3344; G06N 3/08
See application file for complete search history.

(56) References Cited

U.S. PATENT DOCUMENTS 7,321,856 B1 * 1/2008 Porter ............... G10L 15/22
704/E15.04
10,431,216 B1 * 10/2019 Lemon ............... G06F 3/167
(Continued)

FOREIGN PATENT DOCUMENTS

WO WO-2019028352 A1 * 2/2019 ......... G06F 17/2705

OTHER PUBLICATIONS

J. Bekker et al. Learning from positive and unlabeled data: a survey. 2020. arXiv:1811.04820.
(Continued)

*Primary Examiner* — Daniel C Washburn
*Assistant Examiner* — Athar N Pasha
(74) *Attorney, Agent, or Firm* — Pierce Atwood LLP

(57) ABSTRACT

Techniques for selecting a skill to execute in response to a natural language input are described. A system may receive a natural language input, determine profile data associated with the natural language input, and determine the profile data indicates a locale and at least first language and second languages. The system determines first and second sets of skills corresponding to the locale/first language and locale/second language, respectively. The system determines a first group of skill candidates corresponding to a portion of the first set of skills, and determines a second group of skill candidates corresponding to a portion of the second set of skills. The system performs ranking processing across the first and second groups of skills to determine a best skill for responding to the natural language input. Thus, in some situations, the skill invoked may not correspond to the same language represented in the natural language input.

21 Claims, 17 Drawing Sheets

(51) Int. Cl.
*G06N 3/08* (2023.01)
*G10L 15/02* (2006.01)
*G10L 15/22* (2006.01)

(52) U.S. Cl.
CPC .............. *G10L 15/02* (2013.01); *G10L 15/22* (2013.01); *G10L 2015/227* (2013.01)

(56) References Cited

U.S. PATENT DOCUMENTS

| | | | | |
|---|---|---|---|---|
| 2019/0102480 | A1* | 4/2019 | Sreedhara | G10L 25/51 |
| 2019/0318735 | A1* | 10/2019 | Chao | G10L 15/22 |
| 2020/0219491 | A1* | 7/2020 | Jarosz | G10L 15/1822 |
| 2021/0027766 | A1* | 1/2021 | Shi | G10L 15/063 |
| 2021/0158790 | A1* | 5/2021 | Huang | G06N 20/00 |
| 2021/0335342 | A1* | 10/2021 | Yuan | G10L 15/08 |
| 2021/0365896 | A1* | 11/2021 | Davuluri | G06F 3/0484 |
| 2022/0229991 | A1* | 7/2022 | Duong | G06F 40/279 |
| 2022/0351723 | A1* | 11/2022 | Oh | G06F 3/167 |

OTHER PUBLICATIONS

X. Chen et al. Multinomial adversarial networks for multi-domain text classification. In Proceedings of the 2018 Conference of the North American Chapter of the Association for Computational Linguistics: Human Language Technologies, vol. 1 (Long Papers), pp. 1226-1240, 2018.

K. Clark et al. Semi-supervised sequence modeling with cross-view training. 2018. arXiv:1809.08370.

J. Devlin et al. Bert: Pre-training of deep bidirectional transformers for language understanding. arXiv:1810.04805, 2019.

C. Gormley et al. Elasticsearch: the definitive guide: a distributed real-time search and analytics engine. O'Reilly Media, Inc. 2015.

X. He et al. Neural collaborative filtering. 2017. arXiv:1708.05031.

Y.-G. Hsieh, et al. Classification from positive, unlabeled and biased negative data. 36th International Conference on Machine Learning, 2019.

J.-T. Huang et al. Embedding-based retrieval in facebook search. 2020. arXiv:2006.11632.

Z. Huang, et al. Bidirectional lstm-crf models for sequence tagging. arXiv:1508.01991, 2015.

T. Ishida et al. Binary classification from positive-confidence data. 32nd Conference on Neural Information Processing Systems, pp. 5917-5928, 2018.

J. Johnson et al. Billion-scale similarity search with gpus. 2017. IEEE Transactions on Big Data. arXiv: 1702.08734.

G. Karamanolakis et al. Cross-lingual text classification with minimal resources by transferring a sparse teacher. In Proceedings of the 2020 Conference on Empirical Methods in Natural Language Processing: Findings, pp. 3604-3622, 2020.

J.-K. Kim et al. Pseudo labeling and negative feedback learning for large-scale multi-label domain classification. 2020. arXiv: 2003.03728.

Y.-B. Kim et al. Efficient large-scale neural domain classification with personalized attention. 2018. arXiv:1804.08065.

Y.-B. Kim et al. Onenet: Joint domain, intent, slot prediction for spoken language understanding. 2018. arXiv:1801.05149.

S. Qiao et al. Deep co-training for semi-supervised image recognition. 2018. arXiv: 1803.0598.

T. Roelleke et al. Tf-idf uncovered: a study of theories and probabilities (and physics). ACM SIGIR 2008. 28 pages.

E. Sansone et al. Efficient training for positive unlabeled learning. 2019. arXiv:1608.06807.

R. Sennrich et al. Neural machine translation of rare words with subword units. In Proceedings of the 54th Annual Meeting of the Association for Computational Linguistics, pp. 1715-1725, 2016.

H. Shi et al. Positive and unlabeled learning via loss decomposition and centroid estimation. In 27th International Joint Conference on Artificial Intelligence, pp. 2689-2695, 2018.

K. Vale et al. A co-training-based algorithm using confidence values to select instances. In 2020 International Joint Conference on Neural Networks (IJCNN), pp. 1-7. IEEE, 2020.

Y. Vyas et al. Weakly supervised cross-lingual semantic relation classification via knowledge distillation. In Proceedings of the 2019 Conference on Empirical Methods in Natural Language Processing and the 9th International Joint Conference on Natural Language Processing, pp. 5285-5296, 2019.

Y. Wang et al. Adaptive self-training for few-shot neural sequence labeling. arXiv:2010.03680, 2020.

Y. Wu et al. Dual adversarial co-learning for multi-domain text classification. 134th AAAI Conference on Artificial Intelligence, pp. 6438-6445, 2020.

P. Xu aet al. Contextual domain classification in spoken language understanding systems using recurrent neural network. In 2014 IEEE International Conference on Acoustics, Speech and Signal Processing (ICASSP), pp. 136-140. IEEE, 2014.

R. Xu et al. Cross-lingual distillation for text classification. In Proceedings of the 55th Annual Meeting of the Association for Computational Linguistics, pp. 1415-1425, 2017.

F. Yang et al. Asymmetric co-teaching for unsupervised cross person re-identification. 2019. arXiv:1912.01349.

Gediminas Adomavicius et al. Improving aggregate recommendation diversity using ranking-based techniques. IEEE Transactions on Knowledge and Data Engineering 24, 5 (2012), 896-911.

Charu C Aggarwal. 2016. Recommender systems. vol. 1. Springer.

Justin Basilico et al. 2004. Unifying collaborative and content based filtering. In Proceedings of the twenty-first international conference on Machine learning. 9.

Praveen Kumar Bodigutla et al. Joint Turn and Dialogue level User Satisfaction Estimation on Multi-Domain Conversations. arXiv:2010.02495 (2020).

Zhe Cao et al. 2007. Learning to rank: from pairwise approach to listwise approach. In Proceedings of the 24th International conference on Machine learning. 129-136.

Sylvain Castagnos et al. 2013. When Diversity Is Needed . . . But Not Expected!. International Conferance on Advances in Information Mining and Management. Lisbon, Portugal. 44-50.

Heng-Tze Cheng et al. 2016. Wide & deep learning for recommender systems. In Proceedings of the 1st workshop on deep learning for recommender systems. arXiv: 1606.07792.

Michael H Cohen et al. 2004. Voice user interface design. Addison-Wesley Professional.

Paul Covington et al. 2016. Deep neural networks for youtube recommendations. In Proceedings of the 10th ACM conference on recommender systems. 191-198.

Michael D Ekstrand et al. 2014. User perception of differences in recommender algorithms. In Proceedings of the 8th ACM Conference on Recommender systems. 161-168.

Tobias Falke et al. 2020. Leveraging User Paraphrasing Behavior in Dialog Systems to Automatically Collect Annotations for Long-Tail Utterances. In Proceedings of the 28th International Conference on Computational Linguistics: Industry Track. 21-32.

Huifeng Guo et al. DeepFM: a factorization-machine based neural network for CTR prediction. arXiv:1703.04247 (2017).

Ruining He et al. 2016. Ups and downs: Modeling with visual evoluation of fashion trends with one-class collaborative filtering. arXiv: 1602.01585.

Xiangnan He et al. 2017. Neural collaborative filtering. arXiv: 1708.05031.

Sepp Hochreiter et al. 1997. Long short-term memory. Neural Computation. 9. 1735-1780.

Yifan Hu et al. 2008. Collaborative filtering for implicit feedback datasets. In 2008 Eighth IEEE International Conference on Data Mining. Ieee, 263-272.

Bart P Knijnenburg et al. Explaining the user experience of recommender systems. User Modeling and User-Adapted Interaction 22, 4-5 (2012), 441-504.

Yehuda Koren. 2008. Factorization meets the neighborhood: a multifaceted collaborative filtering model. In Proceedings of the 14th ACM SIGKDD International conference on Knowledge discovery and data mining. 426-434.

(56) References Cited

OTHER PUBLICATIONS

Yehuda Koren. 2009. Collaborative filtering with temporal dynamics. In Proceedings of the 15th ACM SIGKDD International conference on Knowledge discovery and data mining. 447-456.

Yehuda Koren et al. Matrix factorization techniques for recommender systems. Computer (2009), 42-49.

Matevž Kunaver et al. Diversity in recommender systems—A survey. Knowledge-Based Systems 123 (2017), 154-162.

Yann LeCun et al. Deep learning. Nature 521 (2015), 436-444.

Bohan Li et al. On the sentence embeddings from pre-trained language models. arXiv:2011.05864 (2020).

Yifei Ma et al. 2020. Temporal-Contextual Recommendation in Real-Time. In Proceedings of the 26th ACM SIGKDD International Conference on Knowledge Discovery & Data Mining. 2291-2299.

Sean M McNee et al. 2006. Being accurate is not enough: how accuracy metrics have hurt recommender systems. In CHI'06 extended abstracts on Human factors in computing systems. 1097-1101.

Xia Ning et al. 2011. Slim: Sparse linear methods for top-n recommender systems. In 2011 11th IEEE International Conference on Data Mining. IEEE, 497-506.

Wichian Premchaiswadi et al. 2013. Enhancing diversity-accuracy technique on user-based top-n recommendation algorithms. In 2013 IEEE 37th Annual Computer Software and Applications Conference Workshops. IEEE, 403-408.

Jure Leskovec et al. 2014. Mining of massive datasets. Cambridge University Press.

Nils Reimers et al. 2019. Sentence-bert: Sentence embeddings using siamese bert-networks. arXiv:1908.10084 (2019).

Steffen Rendle. 2010. Factorization machines. In 2010 IEEE International Conference on Data Mining. IEEE, 995-1000.

Steffen Rendle et al. BPR: Bayesian personalized ranking from implicit feedback. UAI. 452-461 (2012).

Badrul Sarwar et al. 2001. Item-based collaborative filtering recommendation algorithms. In Proceedings of the 10th international conference on World Wide Web. 285-295.

Jianing Sun et al. 2020. A Framework for Recommending Accurate and Diverse Items Using Bayesian Graph Convolutional Neural Networks. In Proceedings of the 26th ACM SIGKDD International Conference on Knowledge Discovery & Data Mining. 2030-2039.

Martijn C Willemsen et al. Understanding the role of latent feature diversification on choice difficulty and satisfaction. User Modeling and User-Adapted Interaction 26 (2016), 347-389.

Sheng Zhang et al. 2006. Learning from incomplete ratings using non-negative matrix factorization. In Proceedings of the 2006 SIAM international conference on data mining. SIAM, 548-552.

Cai-Nicolas Ziegler et al. 2005. Improving recommendation lists through topic diversification. In Proceedings of the 14th international conference on World Wide Web. 22-32.

\* cited by examiner

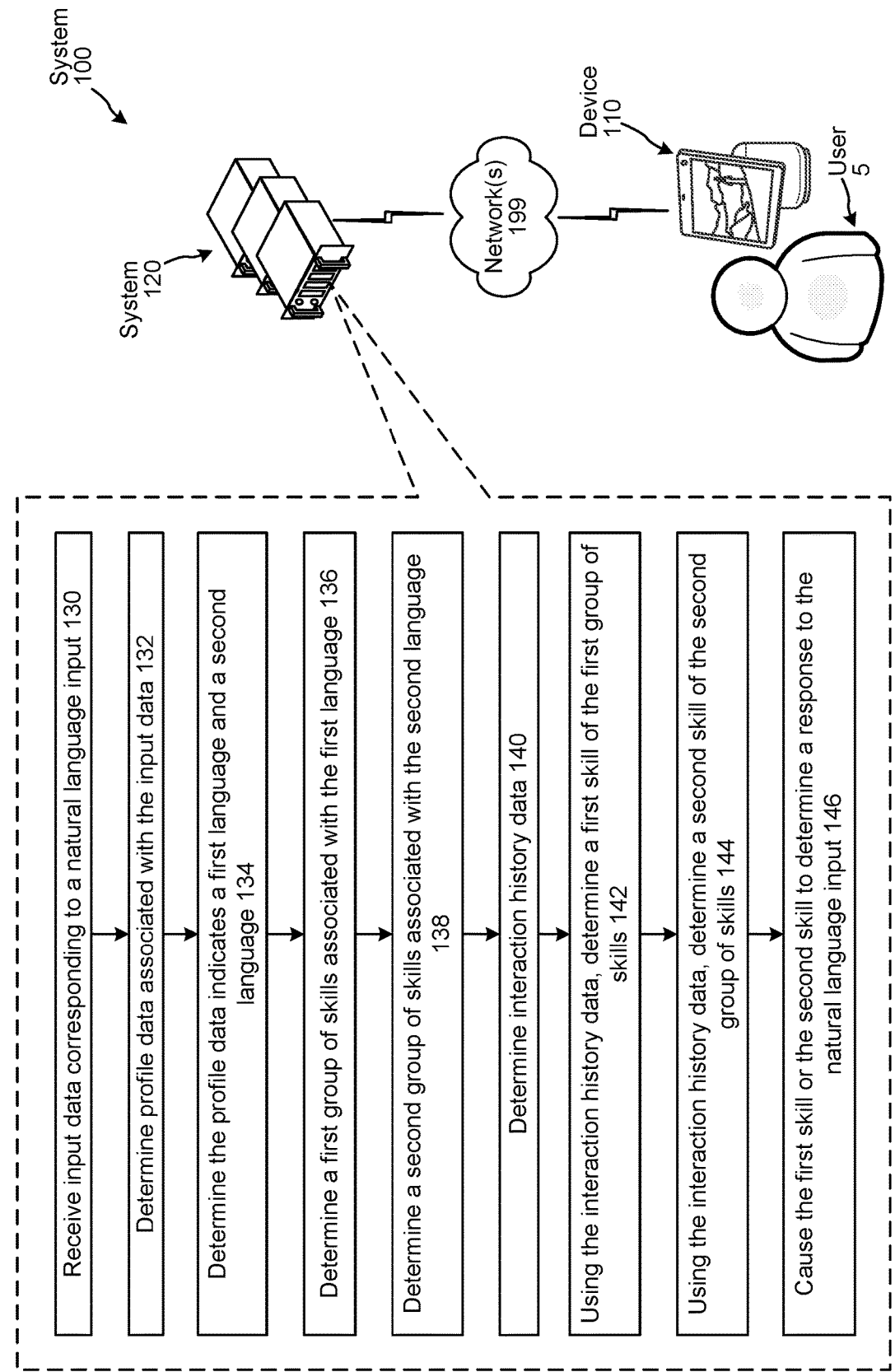

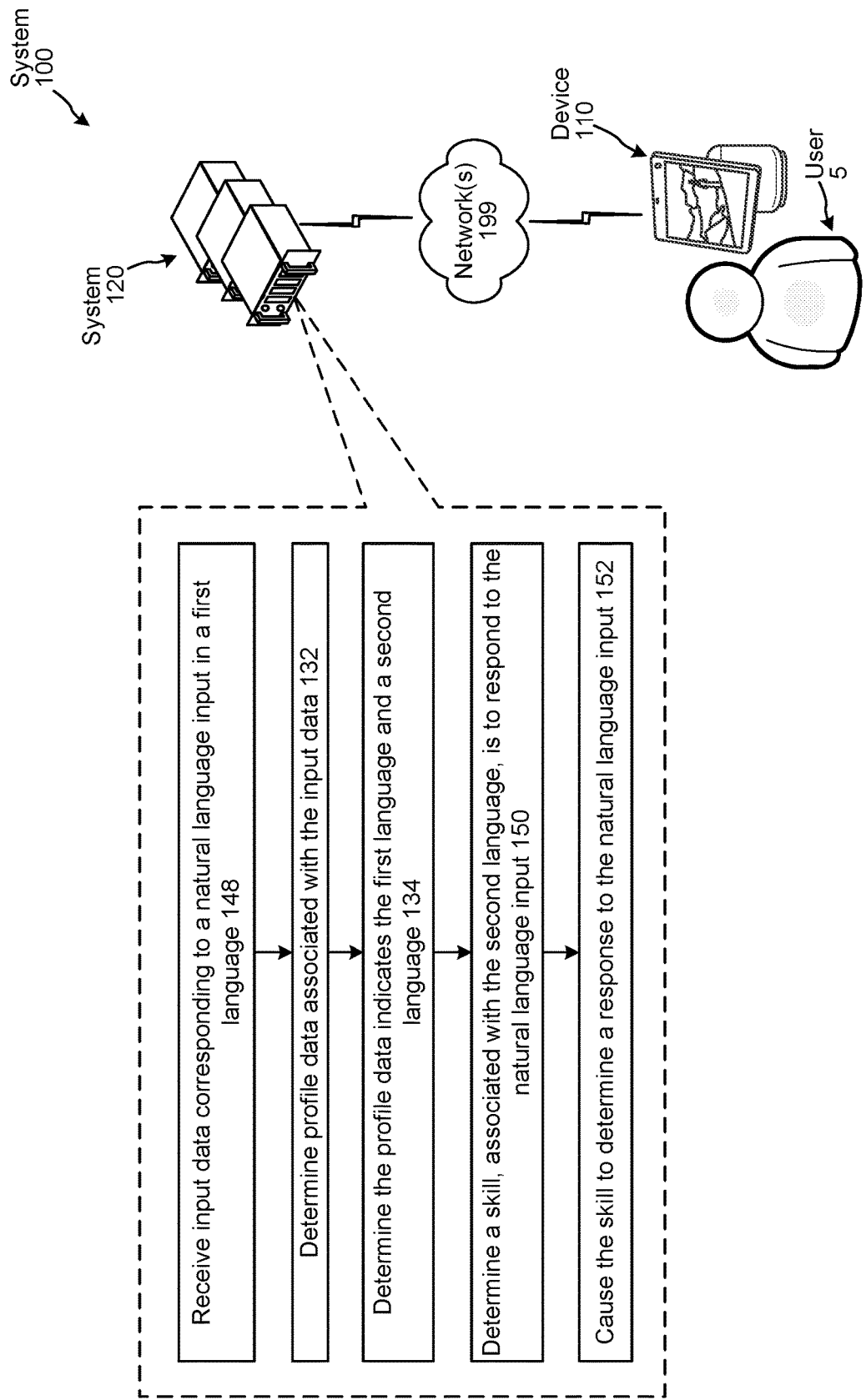

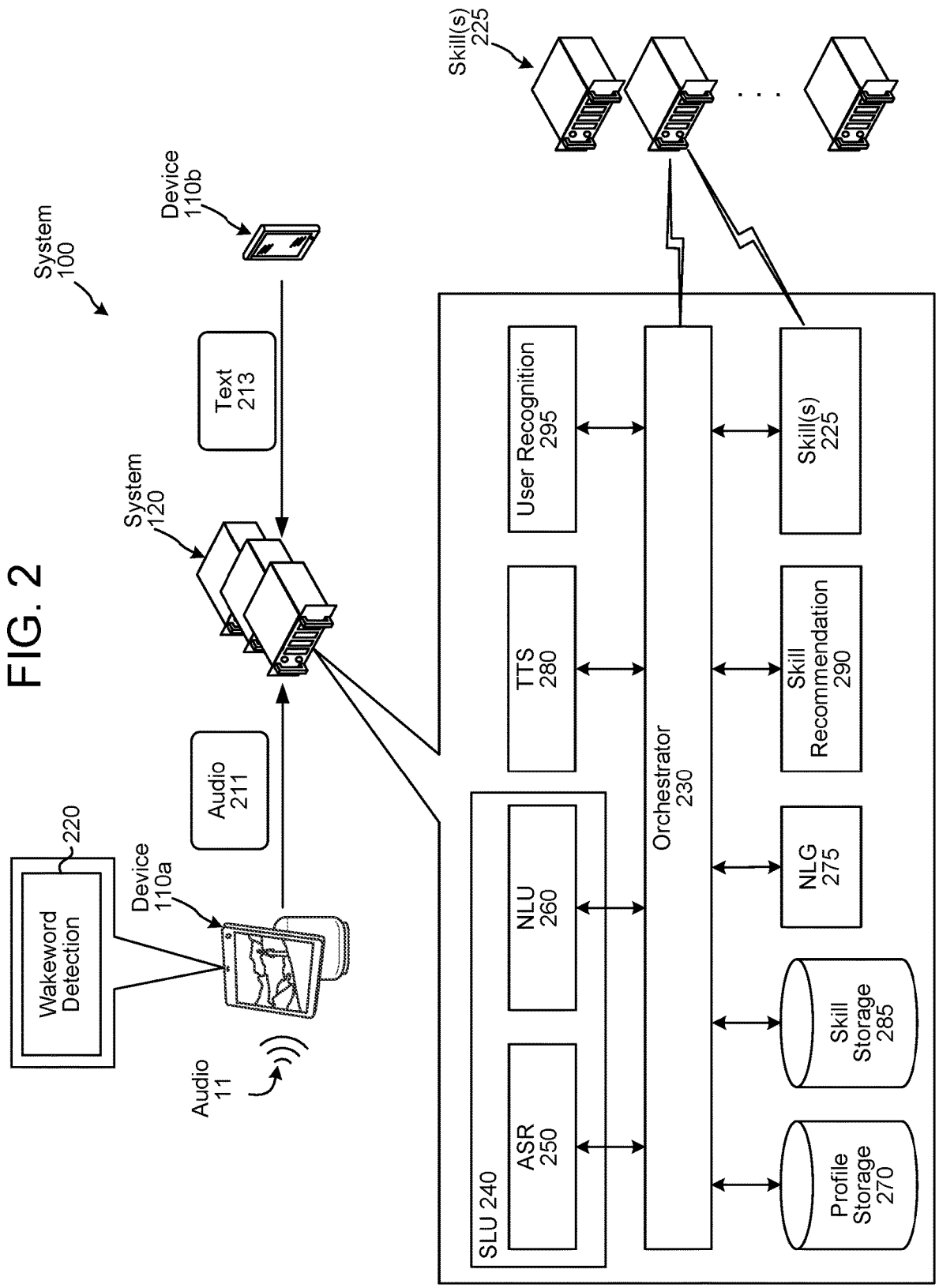

SKILL SELECTION FOR RESPONDING TO NATURAL LANGUAGE INPUTS

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating a system configured to select a skill for responding to a natural language input, according to embodiments of the present disclosure.

FIG. 1B is a conceptual diagram illustrating another way in which the system may be configured to select a skill for responding to a natural language input, according to embodiments of the present disclosure.

FIG. 2 is a conceptual diagram of components of the system, according to embodiments of the present disclosure.

DETAILED DESCRIPTION

Figure 3:
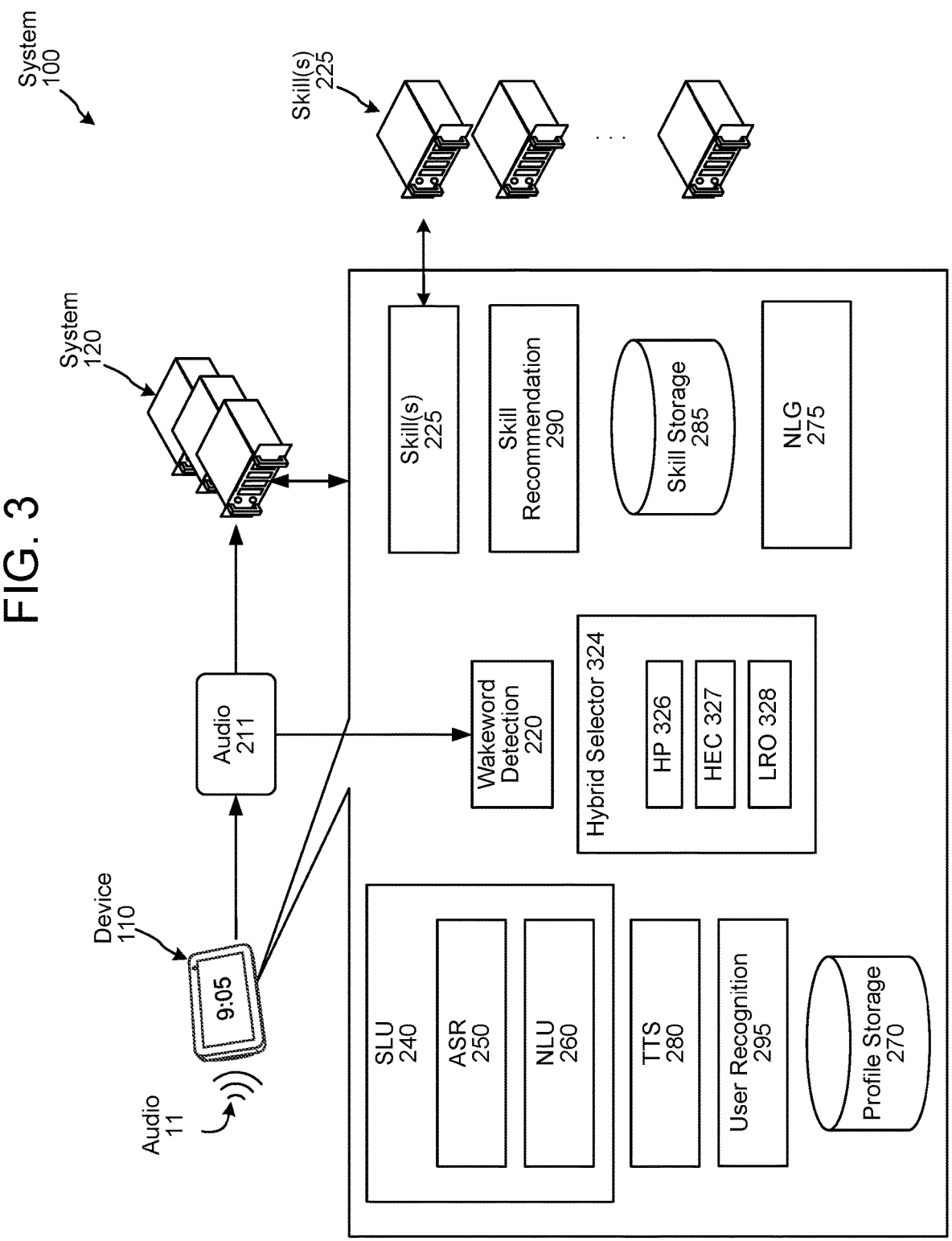
FIG. 3 is a conceptual diagram illustrating components that may be included in a device, according to embodiments of the present disclosure.

Automatic speech recognition (ASR) is a field of computer science, artificial intelligence, and linguistics concerned with transforming audio data associated with speech into a token or textual representation of that speech. Natural language understanding (NLU) is a field of computer science, artificial intelligence, and linguistics concerned with enabling computers to derive meaning from natural language inputs (such as spoken inputs). ASR and NLU are often referred to collectively as spoken language understanding (SLU). Text-to-speech (TTS) is a field of computer science concerning transforming textual and/or other data into audio data that is synthesized to resemble human speech.

A system may be configured to perform actions responsive to utterances (i.e., spoken natural language inputs). For example, for the utterance "tell me a joke," the system may execute a joke skill to output one or more jokes. For further example, for the utterance "what is today's weather," the system may execute a weather skill to generate an output of weather information based on where the user is located.

As used herein, a "skill" may refer to software, that may be placed on a machine or a virtual machine (e.g., software that may be launched in a virtual instance when called), configured to process NLU output data and perform one or more actions in response thereto. What is described herein as a skill may be referred to using different terms, such as a processing component, an application, an action, a bot, or the like.

In some instances, a single locale may be associated with skills associated with different languages. For example, a locale may be associated with a first music skill configured to output music in a first language (e.g., English) and a second music skill configured to output music in a second language (e.g., Spanish). For further example, a locale may be associated with a first joke skill configured to output jokes in a first language (e.g., English) and a second joke skill configured to output jokes in a second language (e.g., French). As used herein, a "locale" refers to a city, county, state, country, continent, or some other geographic area.

The present disclosure provides, among other things, techniques for strategically selecting a skill to respond to a natural language input (e.g., an utterance or typed natural language input). Some embodiments of the present disclosure relate to a large-scale, multi-stage, multi-lingual skill recommendation system. The skill recommendation system includes multiple stages configured to improve the relevancy of the skill candidates at each stage, as the skill recommendation system reduces the number of skill candidates from one stage to the next. In some embodiments, the skill recommendation system may include a skill candidates component (sometimes referred to as a shortlister component) and a skill ranking component (sometimes referred to as a ranker component). The skill candidates component may retrieve a number of (e.g., top k) relevant skills from a skill catalog. These skills may then be ranked by the skill ranking component, and the top ranked (best) skill may be used to generate a response to the natural language input.

In some instances, a user's locale may have skills corresponding to different languages. For example, the locale "United States of America" may be associated with English language skills and Spanish language skills. For further example, the locale "Canada" may be associated with English languages skills and French language skills. The skill recommendation system of the present disclosure is configured to recommend a best skill of the user's locale from among skills of different languages. For example, if the user is located in the United States of America and the user provides an input in English, an English language skill or a Spanish language skill may be used to respond to the user's input.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A shows a system 100 configured to select a skill for responding to a natural language input. Although the figures and discussion of the present disclosure illustrate certain processes in a particular order, the processes described may be performed in a different order (as well as certain processes removed or added) without departing from the present disclosure.

As shown in FIG. 1A, the system 100 may include a device 110, local to a user 5, in communication with a system 120 across a network(s) 199. The user 5 may provide a natural language input to the device 110 using a text-entry device, such as a keyboard or touchscreen, using an audio-capture device, such as a microphone, etc. The device 110 may include an output device, such as a screen, touchscreen, loudspeaker, haptic-feedback device, etc., for relaying communications from the system 120 to the user 5. The network(s) 199 may include the Internet and/or any other wide- or local-area network, and may include wired, wireless, and/or cellular network hardware. While the user 5 is illustrated as a human, it will be appreciated that the present disclosure is not limited thereto, and that the user 5 may be a non-human such as an application, bot, or the like.

At runtime, the device 110 may receive a natural language input from the user 5. For example, the device 110 may receive audio corresponding to an utterance (i.e., a spoken natural language input). In another example, the device 110 may receive a textual natural language input via a keyboard or touchscreen.

The device 110 sends (and the system 120 receives (130)) input data corresponding to the natural language input. For example, the input data may be audio data when the device 110 receives an utterance. In another example, the input data may be text data when the device 110 receives a textual natural language input.

The system 120 determines (132) profile data associated with the input data. For example, the input data may include (or be associated with) a device identifier corresponding to the device 110. In such example, the system 120 may determine profile data (e.g., user profile data corresponding to the user 5 and/or group profile data corresponding to a group of users including the user 5) associated with the device identifier. For further example, the system 120 may determine a user identifier corresponding to the user 5, and may determine profile data (e.g., user profile data and/or group profile data) associated with the user identifier.

The system 120 determines (134) the profile data indicates a first language and a second language. The first and second languages may be any two different languages (e.g., any two of English, Spanish, French, Italian, Mandarin, Swahili, etc.). The first and second languages may be languages spoken by the user 5, or a group of users (e.g., a household of users) to which the user 5 belongs.

The system 120 may execute various skills, with a skill being associated with at least one particular locale and language. The system 120 may determine (136) a first group of skills associated with the first language. For example, the system 120 may query a skill storage for skill identifiers associated with the first language. The system 120 may similarly determine (138) a second group of skills associated with the second language.

In some situations, the profile data may also indicate a locale (e.g., a city, county, country, state, continent, etc.). In some situations, the system 120 may determine a locale based on, for example, a network component identifier (such as an identifier of a proxy server that received the input data from the device 110). In such situations, the system 120 may determine the first group of skills by querying the skill storage for skill identifiers associated with the first language and the locale, and may similarly determine the second group of skills by querying the skill storage for skill identifiers associated with the second language and the locale. In these instances, it will be appreciated that the query may return a group of skill identifiers associated with the specific locale.

In some embodiments, the system 120 may determine the first and second groups of skills based on something other than the user profile data. For example, the system 120 may determine the first and second groups of skills based on the device 110 (e.g., some devices may be associated with specific skills unique to the device 110) and/or a location of a network device (e.g., Wi-Fi router) to which the device 110 is connected.

The system 120 determines (140) interaction history data. In some embodiments, the interaction history data may be associated with the profile data. For example, the interaction history data may indicate one or more skills that were executed in response to previous natural language inputs (e.g., from the user 5). For further example, the interaction history data may include one or more of the previous natural language inputs (e.g., of the user 5). In some embodiments, the interaction history data may correspond to a duration of time, such as the last day, the last week, the last month, the last year, etc.

Using the interaction history data, the system 120 determines (142) a first skill of the first group of skills. Further, using the interaction history data, the system 120 determines (144) a second skill of the second group of skills. Determination of the first and second skills is described in detail herein with respect to FIGS. 4-10.

The system 120 causes (146) the first skill or the second skill to determine a response to the natural language input. The system 120 may send an instruction to the selected first or second skill to determine the response. The system 120 may also send data corresponding to the natural language input (e.g., NLU output data) to the selected first or second skill. For example, the response can be the outputting of music, the playing of a video, the outputting of synthesized speech and/or displayed text corresponding to weather information, the outputting of synthesized speech and/or displayed text indicating a restaurant reservation has been scheduled, etc.

In some embodiments, the selected first or second skill may be associated with a same language as that of the natural language input. In other embodiments, the selected first or second skill may be associated with a language different than that of the natural language input but nonetheless represented in the profile data for the user 5. As such, the system 120 may select and execute a skill associated with a language of the user 5 and that best responds to the natural language input, without being constrained by the language in which the natural language input is provided.

While the foregoing description of FIG. 1A describes processing performed by the system 120, the present disclosure is not limited thereto. In some embodiments, the system 120 and the device 110 may each perform a portion of the processing of FIG. 1. In some embodiments, the device 110 may perform all the processing described with respect to FIG. 1.

FIG. 1B shows another process by which the system 100 may select a skill for responding to a natural language input. As shown in FIG. 1B, the device 110 sends (and the system 120 receives (148)) input data corresponding to the natural language input in a first language. The system 120 determines (132) profile data associated with the input data, and determines (134) the profile data indicates the first language and a second language. In the example of FIG. 1B, the system 120 determines (150) a skill, associated with the second language, is to respond to the natural language input. Such determination is described in detail herein below with respect to FIGS. 5-11. The system 120 thereafter causes (152) the skill to determine a response to the natural language input (as described herein above with respect to step 146). Thus, FIG. 1B describes a situation where the natural language input is received in first language, and the skill output is in a second language.

While the foregoing description of FIG. 1B describes processing performed by the system 120, the present disclosure is not limited thereto. In some embodiments, the system 120 and the device 110 may each perform a portion of the processing of FIG. 1B. In some embodiments, the device 110 may perform all the processing described with respect to FIG. 1B.

The system 100 may operate using various components as illustrated in FIG. 2. The various components may be located on a same or different physical devices. Communication between various components may occur directly or across a network(s) 199.

A microphone or array of microphones (of or otherwise associated with the device 110a) may capture audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110a may implement a classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110a may determine if the speech is directed at the device 110a/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 220 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110a may "wake" and begin transmitting audio data 211, representing the audio 11, to the system 120. The audio data 211 may include the detected wakeword, or the device 110a may remove the portion of the audio data, corresponding to the detected wakeword, prior to sending the audio data 211 to the system 120.

The system 120 may include an orchestrator component 230 configured to, among other things, coordinate data transmissions between components of the system 120. The orchestrator component 230 may receive the audio data 211 from the device 110a, and send the audio data 211 to an ASR component 250.

The ASR component 250 transcribes the audio data 211 into ASR output data including one or more ASR hypotheses. An ASR hypothesis may be configured as a textual interpretation of the speech in the audio data 211, or may be configured in another manner, such as one or more tokens. Each ASR hypothesis may represent a different likely interpretation of the speech in the audio data 211. Each ASR hypothesis may be associated with a score (e.g., confidence score, probability score, or the like) representing the associated ASR hypothesis correctly represents the speech in the audio data 211.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In at least some instances, instead of the device 110a receiving a spoken natural language input, a device 110b (e.g., a smart phone, tablet, or the like) may receive a textual (e.g., typed) natural language input. The device 110b may determine text data 213 representing the textual natural language input, and may send the text data 213 to the system 120, wherein the text data 213 is received by the orchestrator component 230. The orchestrator component 230 may send the text data 213 or ASR output data, depending on the type of natural language input received, to a NLU component 260.

The NLU component 260 processes the ASR output data or text data to determine one or more NLU hypotheses embodied in NLU output data. The NLU component 260 may perform intent classification (IC) processing on the ASR output data or text data to determine an intent of the natural language input. An intent corresponds to an action to be performed that is responsive to the natural language input. To perform IC processing, the NLU component 260 may communicate with a database of words linked to intents. For example, a music intent database may link words and phrases such as "quiet," "volume off," and "mute" to a <Mute> intent. The NLU component 260 identifies intents by comparing words and phrases in ASR output data or text data to the words and phrases in an intents database. In some embodiments, the NLU component 260 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 260 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 260 may be linked to one or more grammar frameworks with entity types to be populated with entity values. Each entity type of a grammar framework corresponds to a portion of ASR output data or text data that the NLU component 260 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 260 may perform NER processing to identify words in ASR output data or text data as subject, object, verb, preposition, etc. based on grammar rules and/or models. Then, the NLU component 260 may perform IC processing using the identified verb to identify an intent. Thereafter, the NLU component 260 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 260 may generate NLU output data including one or more NLU hypotheses, with each NLU hypothesis including an intent and optionally one or more entity types and corresponding entity values. In some embodiments, the NLU component 260 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 250 and the NLU component 260). In at least some embodiments, the system 120 may implement a spoken language understanding (SLU) component 240 configured to process audio data 211 to determine NLU output data.

The SLU component 240 may be equivalent to a combination of the ASR component 250 and the NLU component 260. Yet, the SLU component 240 may process audio data 211 and directly determine the NLU output data, without an intermediate step of generating ASR output data. As such, the SLU component 240 may take audio data 211 representing a spoken natural language input and attempt to make a semantic interpretation of the spoken natural language input. That is, the SLU component 240 may determine a meaning associated with the spoken natural language input and then implement that meaning. For example, the SLU component 240 may interpret audio data 211 representing a spoken natural language input in order to derive a desired action. The SLU component 240 may output a most likely NLU hypothesis, or multiple NLU hypotheses associated with respective confidence or other scores (such as probability scores, etc.).

The system 120 may include or otherwise communicate with one or more skills 225. As mentioned previously, a "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill 225 may operate in conjunction between the system 120 and other devices, such as the device 110, a restaurant electronic ordering system, a taxi electronic booking system, etc. in order to complete certain functions. Inputs to a skill 225 may come from speech processing interactions or through other interactions or input sources.

A skill 225 may be associated with a domain, a non-limiting list of which includes a smart home domain, a music domain, a video domain, a weather domain, a communications domain, a flash briefing domain, a shopping domain, and a custom domain.

The system 120 may include a TTS component 280 that generates audio data including synthesized speech. The data input to the TTS component 280 may come from a skill 225, the orchestrator component 230, or another component of the system 120.

In one method of synthesis called unit selection, the TTS component 280 matches input data against a database of recorded speech. The TTS component 280 selects matching units of recorded speech and concatenates the units together to form audio data. In another method of synthesis called parametric synthesis, the TTS component 280 varies parameters such as frequency, volume, and noise to determine audio data including an artificial speech waveform. Parametric synthesis uses a computerized voice generator, sometimes called a vocoder.

The system 120 includes a natural language generation (NLG) component 275. The NLG component 275 can generate natural language (e.g., text) data for input to the TTS component 280. For example, the NLG component 275 may generate natural language data corresponding to instructions corresponding to a particular action for the user to perform. The NLG component 275 may generate appropriate natural language data for various outputs as described herein. The NLG component 275 may include one or more trained models configured to output natural language data appropriate for a particular input. The natural language data, output by the NLG component 275, may become input for the TTS component 280. Additionally or alternatively, a skill 225 may implement natural language generation processing to generate natural language data, and the skill-output natural language data may be input to the TTS component 280.

The NLG component 275 may generate natural language data having a natural feel and, in some embodiments, including words and/or phrases specifically formatted for the user 5. The NLG component 275, in some embodiments, may use one or more templates to generate natural language data. In some embodiments, the NLG component 275 may include models trained from the various templates for forming the natural language data. For example, the NLG component 275 may analyze transcripts of local news programs, television shows, sporting events, or any other media program to obtain common components of a relevant language and/or region. As one illustrative example, the NLG component 275 may analyze a transcription of a regional sports program to determine commonly used words or phrases for describing scores or other sporting news for a particular region. The NLG component 275 may further receive, as inputs, a dialog history, an indicator of a level of formality, and/or a natural language user input history.

As disclosed herein, different skills may correspond to different languages. Accordingly, the outputs of different skills may be in different languages. The NLU component 275 (or NLG processing performed by a skill) may select words and idiom for natural language data based on the particular language of the skill, and how humans commonly speak the language.

The NLG component 275 may generate natural language data based on one or more response templates. For example, the NLG component 275 may select a template in response to the question, "what is the weather currently like" of the form: "the weather currently is $weather_information$." The NLG component 275 may analyze the logical form of the template to produce one or more natural language responses including markups and annotations to familiarize the response that is generated. In some embodiments, the NLG component 275 may determine which response is the most appropriate response to be selected. The selection may be based on past natural language responses, past natural language input, a level of formality, and/or any other feature, and combinations thereof.

The system 120 may include a user recognition component 295. The user recognition component 295 may recognize one or more users using various data. The user recognition component 295 may take as input the audio data 211. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, retina data, etc.), received by the system 120 in correlation with a natural language input, to stored biometric data of users. The user recognition component 295 may additionally or alternatively perform user recognition by comparing image data (e.g., including a representation of at least a feature of a user), received by the system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that received the natural language input.

The user recognition component 295 determines whether a natural language input originated from a particular user. For example, the user recognition component 295 may determine a first value representing a likelihood that a natural language input originated from a first user, a second value representing a likelihood that the natural language input originated from a second user, etc. The user recognition component 295 may also determine an overall confidence regarding the accuracy of user recognition processing.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill 225, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 270 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 225 that the user has enabled. When a user enables a skill 225, the user is providing the system 120 with permission to allow the skill 225 to execute with respect to the user's natural language inputs. If a user does not enable a skill 225, the system 120 may not execute the skill 225 with respect to the user's natural language inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The system 120 may also include a skill storage 285 and skill recommendation component 290, which are described in detail herein below with respect to FIGS. 4-10.

The foregoing describes illustrative components and processing of the system 120. The following describes illustrative components and processing of the device 110. As illustrated in FIG. 3, in at least some embodiments the system 120 may receive the audio data 211 from the device 110, to recognize speech corresponding to a spoken natural language in the received audio data 211, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., an audio or video call) between the user 5 and another user, and so on.

As noted with respect to FIG. 2, the device 110 may include a wakeword detection component 220 configured to used to detect a wakeword (e.g., "Alexa") that indicates to the device 110 that the audio data 211 is to be processed for determining NLU output data. In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the system 120 and/or an on-device ASR component 250. The wakeword detection component 220 may also send an indication, to the hybrid selector 324, representing a wakeword was not detected. In response to receiving such an indication, the hybrid selector 324 may refrain from sending the audio data 211 to the system 120, and may prevent the on-device ASR component 250 from processing the audio data 211. In this situation, the audio data 211 can be discarded.

The device 110 may conduct its own speech processing using on-device language processing components (such as an on-device SLU component 240, an on-device ASR component 250, and/or an on-device NLU component 260) similar to the manner discussed above with respect to the speech processing system-implemented SLU component 240, ASR component 250, and NLU component 260. The device 110 may also internally include, or otherwise have access to, other components such as one or more skills 225, a user recognition component 295 (configured to process in a similar manner to the speech processing system-implemented user recognition component 295), profile storage 270 (configured to store similar profile data to the speech processing system-implemented profile storage 270), the skill recommendation component 290, the skill storage 285, the NLG component 275, the TTS component 280, and other components. In at least some embodiments, the on-device profile storage 270 may only store profile data for a user or group of users specifically associated with the device 110.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the on-device ASR component 250 about the availability of the audio data 211, and to otherwise initiate the operations of on-device language processing when the audio data 211 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 326 may allow the audio data 211 to pass through to the system 120 and the HP 326 may also input the audio data 211 to the on-device ASR component 250 by routing the audio data 211 through the HEC 327 of the hybrid selector 324, whereby the LRO 328 notifies the on-device ASR component 250 of the audio data 211. At this point, the hybrid selector 324 may wait for response data from either or both the system 120 and/or the on-device language processing components. However, the disclosure is not limited thereto, and in some examples the hybrid selector 324 may send the audio data 211 only to the on-device ASR component 250 without departing from the disclosure. For example, the device 110 may process the audio data 211 on-device without sending the audio data 211 to the system 120.

The on-device ASR component 250 is configured to receive the audio data 211 from the hybrid selector 324, and to recognize speech in the audio data 211, and the on-device NLU component 260 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 260) may be selected as usable to respond to a natural language input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 5.

The device 110 and/or the system 120 may associate a unique identifier with each natural language input. The device 110 may include the unique identifier when sending the audio data 211 to the system 120, and the response data from the system 120 may include the unique identifier to identify to which natural language input the response data corresponds.

In at least some embodiments, the device 110 may include one or more skills 225 that may process similarly to the speech processing system-implemented skill(s) 225. The skill(s) 225 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 4:
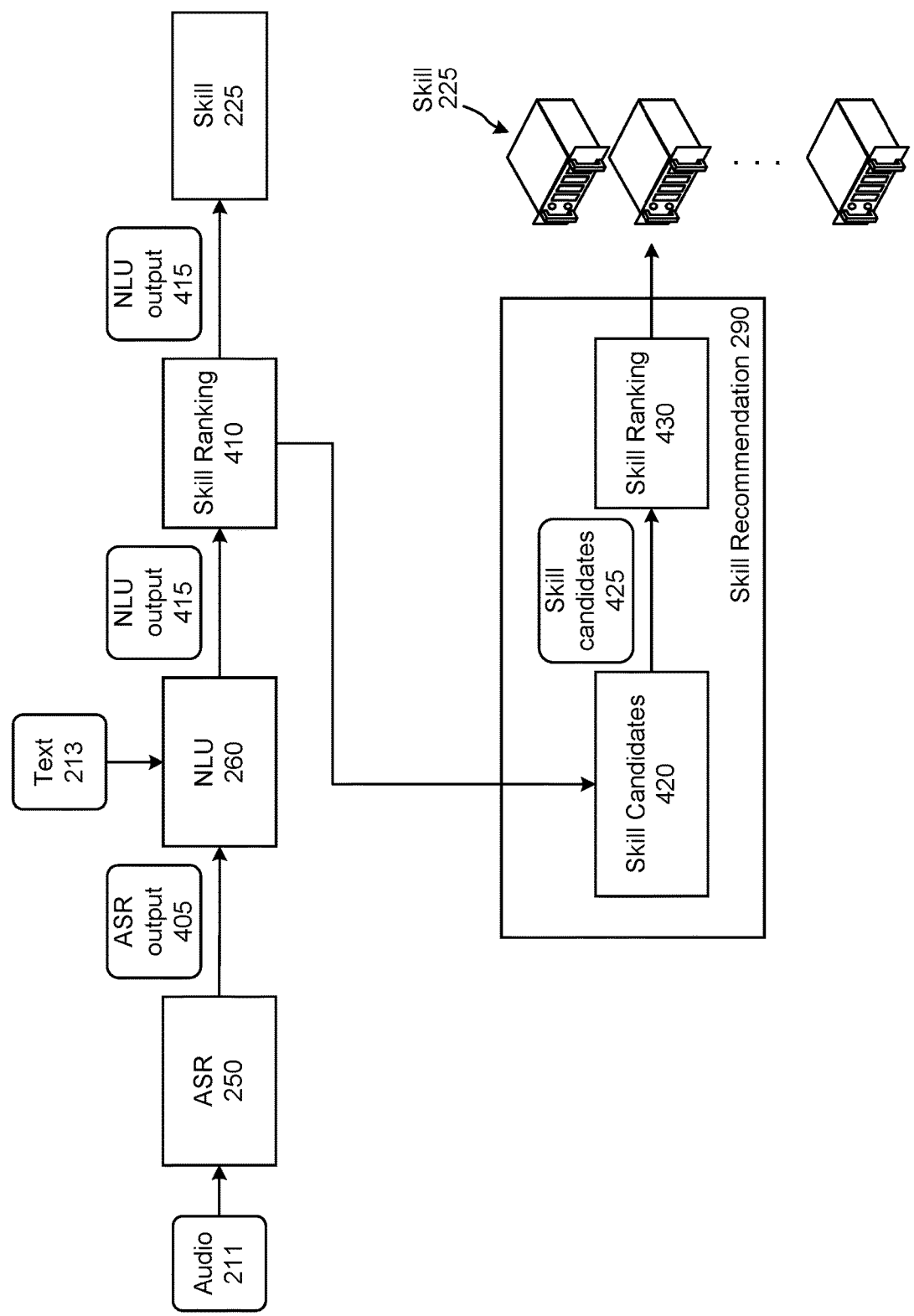
FIG. 4 is a conceptual diagram illustrating an example processing flow of natural language inputs, according to embodiments of the present disclosure.

Referring now to FIG. 4, an example processing flow of natural language inputs is described. While not illustrated, it will be appreciated that the orchestrator component 230 may receive and send data, represented in FIG. 4, to the processing components represented in FIG. 4.

When a spoken natural language input is received, the audio data 211 may be input to the ASR component 250, which may generate ASR output data 405 as described herein above with respect to FIG. 2. The ASR output data 405 may be input to the NLU component 260, which may generate NLU output data 415 as described herein above with respect to FIG. 2.

Alternatively, the audio data 211 may be input to the SLU component 240, which may generate the NLU output data 415. In the situation where the natural language input is textual, the text data 213 of the textual natural language input may be input into the NLU component 260 without ASR processing being performed.

The NLU output data 415 may be input to a skill ranking component 410. The skill ranking component 410 may, in some embodiments, be configured to determine whether a skill 225, implemented by the system 120 or device 110, is to be called to respond to the spoken natural language input represented in the audio data 211. If the skill ranking component 430 determines a skill 225 implemented by the system 120 or device 110 is to execute, the skill ranking component 410 may send the NLU output data 415 to the skill 225. Conversely, if the skill ranking component 410 determines a skill implemented by the system 120 or device 110 is not to be called, or is unable to determine with at least a threshold confidence that a skill implemented by the system 120 or device 110 is to be called, the skill ranking component 410 may cause the skill recommendation component 290 to process. The skill ranking component 410 may send the NLU output data 415 and/or other data corresponding to the natural language input to the skill recommendation component 290.

In the example of FIG. 4, the skill recommendation component 290 may be configured to determine a skill 225, implemented separately from and in communication with the system 120/device 110, that is to be called to respond to the natural language input represented in the audio data 211 or the text data 213. The skill recommendation component 290 may include a skill candidates component 420 and a skill ranking component 430.

The skill candidates component 420 may select a top-k relevant skills for responding to the natural language input. Configuration of and processing performed by the skill candidates component 420 is described herein below with respect to FIGS. 4-9. In any event, the skill candidates component 420 may send skill candidates data 425, representing a plurality of skills, to the skill ranking component 430.

The skill ranking component 430 may rank the skills, represented in the skill candidates data 425, to determine a single skill 225 that is to execute to respond to the natural language input, with the single skill 225 being implemented separately from and in communication with the system 120/device 110. Configuration of and processing performed by the skill ranking component 430 is described herein below with respect to FIGS. 4-5 and 10-11.

In some embodiments, the system 120/device 110 may not implement the skill ranking component 410. In such embodiments, the NLU output data 415 may be sent to the skill recommendation component 290, and the skill recommendation component 290 may determine a single skill from among both skills implemented by the system 120/device 110 and skills implemented separately from and in communication with the system 120/device 110.

Figure 5:
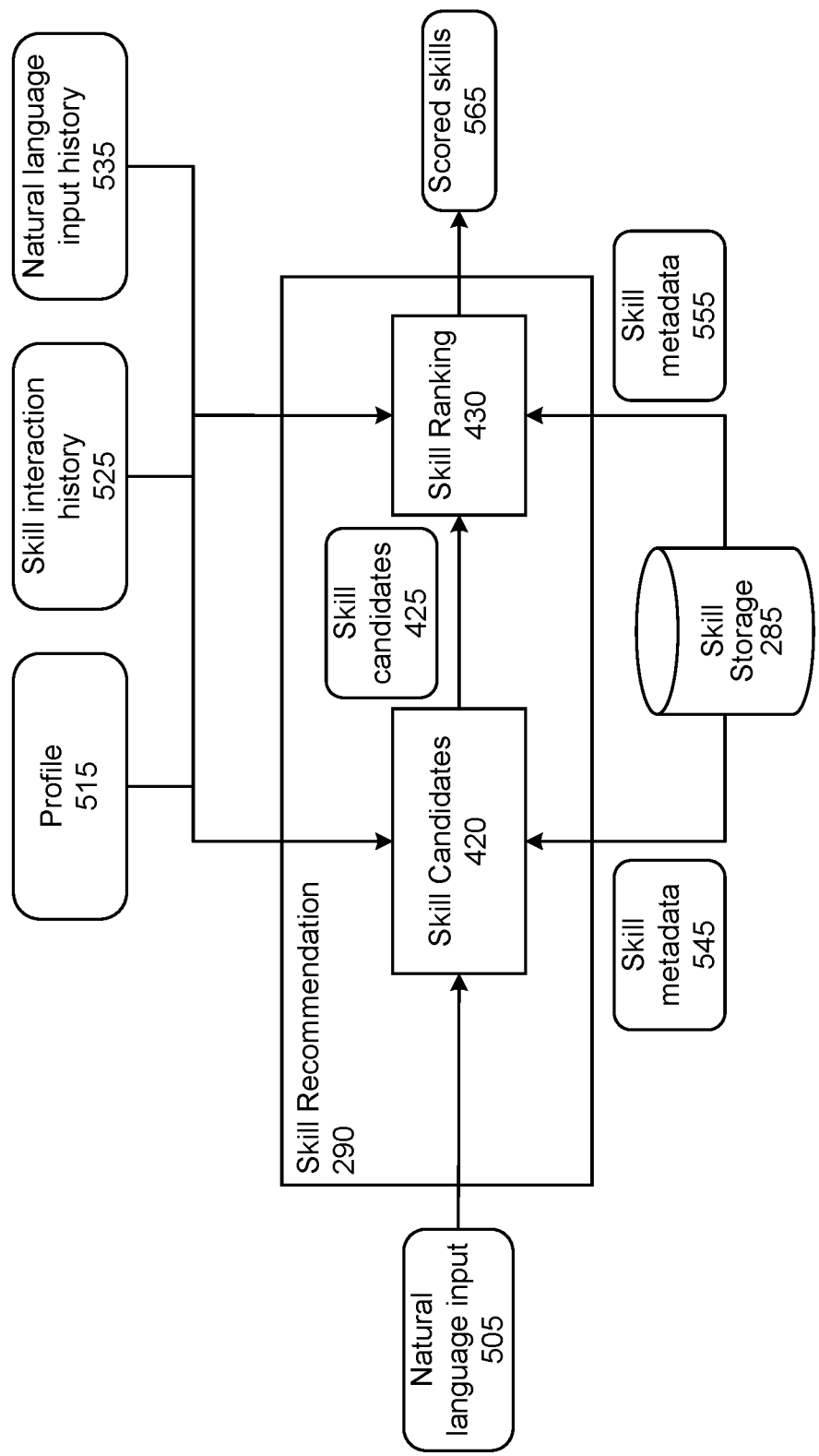
FIG. 5 is a conceptual diagram of a skill recommendation component, according to embodiments of the present disclosure.

Now turning to FIG. 5, further details of the skill recommendation component 290 are described. The skill candidates component 420 may receive natural language input data 505 corresponding to the instant spoken or textual natural language input. The natural language input data 505 may include various types of information including, but not limited to, ASR output data corresponding to the natural language input and/or NLU output data corresponding to the natural language input.

The skill candidates component 420 may determine a top-k skills 225 (represented as the skill candidates data 425 in FIG. 5) for responding to the natural language input. The skill candidates component 420 may determine the top-k skills 225 based on various data such as, but not limited to, profile data 515, skill interaction history data 525 (sometimes referred to as skill history data), natural language input history data 535 (sometimes referred to as input history data), and/or skill metadata 545.

The profile data 515 may include various information specific to the user 5 including, but not limited to, a geographic location (e.g., a city, state, country, etc.), one or more languages, a preferred language, a user age, gender, and/or other like information. As an example, the natural language input data 505 may include a user identifier, determined by the user recognition component 295 for the instant natural language input, and/or a device identifier 110 corresponding to the device 110 that received the natural language input. The skill candidates component 420 may receive the profile data 515 in response to querying the profile storage 270 for data associated with the user identifier and/or device identifier.

The skill interaction history data 525 may include one or more skill identifiers, with each skill identifier corresponding to a skill that processed with respect to at least one previous natural language input of the user 5 and/or received by the device 110. As an example, the skill candidates component 420 may receive the skill interaction history data 525 in response to querying the profile storage 270 (or another storage implemented by the system 120/device 110) for skill identifiers represented in a usage history associated with the user identifier and/or device identifier. In some embodiments, the skill candidates component 420 may query the profile storage 270 or other storage for skill interaction history data 525 representing only skill identifiers corresponding to skills that have executed within a past duration of time (e.g., a past minute(s), a past hour(s), a past day(s), a past week(s), a past month(s), etc.).

The natural language input history data 535 may include one or more natural language inputs previously received from the user 5 and/or by the device 110. Each natural language input may be embodied, in the natural language input history data 535, as ASR output data and/or NLU output data. As an example, the skill candidates component 420 may receive the natural language input history data 535 in response to querying the profile storage 270 (or another storage implemented by the system 120/device 110) for natural language inputs represented in a usage history associated with the user identifier and/or device identifier. In some embodiments, the skill candidates component 420 may query the profile storage 270 or other storage for natural language input data 535 representing only natural language inputs received within a past duration of time (e.g., associated with a same dialog identifier as the instant natural language input, a past minute(s), a past hour(s), a past day(s), a past week(s), a past month(s), etc.).

As used herein, a "dialog" may refer to an exchange of related natural language inputs and system-generated responses. A dialog may be goal-oriented, meaning the dialog is directed to the system performing a specific action requested by a user (e.g., figuring out what music the system should play). Alternatively, a dialog may not be goal-oriented, for example as part of a freeform conversation between the system and a user that may not have a definite end point or action in mind at the end of the conversation. A natural language input and performance by the system of a corresponding action responsive to the natural language input (i.e., a system-generated response), may be referred to as a dialog "turn." A dialog identifier may be associated with multiple related turns corresponding to consecutive related natural language inputs and system outputs. Each turn may be associated with a respective turn identifier. One natural language input may be considered related to a subsequent natural language input, thereby causing a single dialog identifier to be associated with both natural language inputs. A first natural language input may be considered related to a second (subsequent) natural language input based on, for example, a length of time between receipt of the first and second natural language inputs, a length of time between performance of system-generated response to the first natural language input and receipt of the second natural language input, the substances of the first and second natural language inputs, and/or the substances of the second natural language input and the system-generated response to the first natural language.

The skill candidates component 420 may query the skill storage 285 for skill metadata 545. The skill metadata 545 may correspond to various skills 225 implemented by the system 120/device 110 and/or implemented separately from and in communication with the system 120/device 110. Each portion of the skill metadata 545 corresponding to a particular skill 225 may include various information including, for example, a skill name, a skill description, one or more example natural language inputs for invoking the skill, and/or the like. The one or more example natural language inputs may include one or more example natural language inputs indicated by the skill and/or one or more example natural language inputs determined by the system 120/device 110.

In some embodiments, the skill candidates component 420 may perform search-based processing. In some embodiments, the skill candidates component 420 may perform model-based processing. In some embodiments, the skill candidates component 420 may perform both search-based and model-based processing.

The skill ranking component 430, of the skill recommendation component 290, may receive the skill candidates data 425 output by the skill candidates component 420. The skill candidates data 425 may include skill identifiers corresponding to a subset of the skills represented in the skill metadata 545. Thus, the skill candidates component 420 may function as a filtering component to limit processing of the skill ranking component 430 to skills 225 that are likely to properly process the instant natural language input.

The skill ranking component 430 may generate scored skills data 565 including skill identifiers associated with respective confidence or other (e.g., probability) scores. Such a confidence score may represent the skill ranking component's confidence that the corresponding skill should be executed to respond to the instant natural language input. The confidence score may be represented as a numeric score (e.g., on a scale of 0 to 1, 0 to 10, etc.) or a binned score (e.g., low, medium, high).

The skill ranking component 430 may generate the scored skills data 565 using various data including, but not limited to, the profile data 515, the skill interaction history data 525, the natural language input history data 535, and/or skill metadata 555. The skill ranking component 430 may receive the profile data 515, the skill interaction history data 525, and the natural language input history data 535 by querying one or more relevant storages as described above with respect to the skill candidates component 420. Alternatively, the skill recommendation component 290 may query the relevant storage(s) for the profile data 515, the skill interaction history data 525, and/or the natural language input history data 535, and the skill recommendation component 290 may input the profile data 515, the skill interaction history data 525, and/or the natural language input history data 535 to both the skill candidates component 420 and the skill ranking component 430.

The skill ranking component 430 may query the skill storage 285 for the skill metadata 555. More specifically, the skill ranking component 430 may query the skill storage 285 for skill metadata corresponding to the skills associated with the skill identifiers represented in the skill candidates data 425 Each portion of the skill metadata 555 corresponding to a particular skill 225 may include various information including, for example, a skill name, a skill description, a skill category (e.g., business & finance, connected car, education & reference, food & drink, games & trivia, health & fitness, kids, lifestyle, local, movies & TV, music & audio, new, humor, productivity, shopping, smart home, social, sports, travel & transportation, utilities, weather, etc.), a skill subcategory, one or more example natural language inputs for invoking the skill, and/or the like. The one or more example natural language inputs may include one or more example natural language inputs indicated by the skill and/or one or more example natural language inputs determined by the system 120/device 110.

In some embodiments, the skill ranking component 430 may perform model-based processing. Configurations of the skill ranking component 430 are described in detail below with respect to FIGS. 10-11.

It will be appreciated that the processing of the components of the skill recommendation component 290 may reduce the number of skills considered from one stage to the next. For example, the skill metadata 545, input to the skill candidates component 420, may represent a larger number of skills than the skill candidates 425 and skill metadata 555 input to the skill ranking component 430. Moreover, in some embodiments, the skill candidates 425 and skill metadata 555, input to the skill ranking component 430, may represent a larger number of skills than the scored skills data 565 output by the skill ranking component 430.

Figure 6:
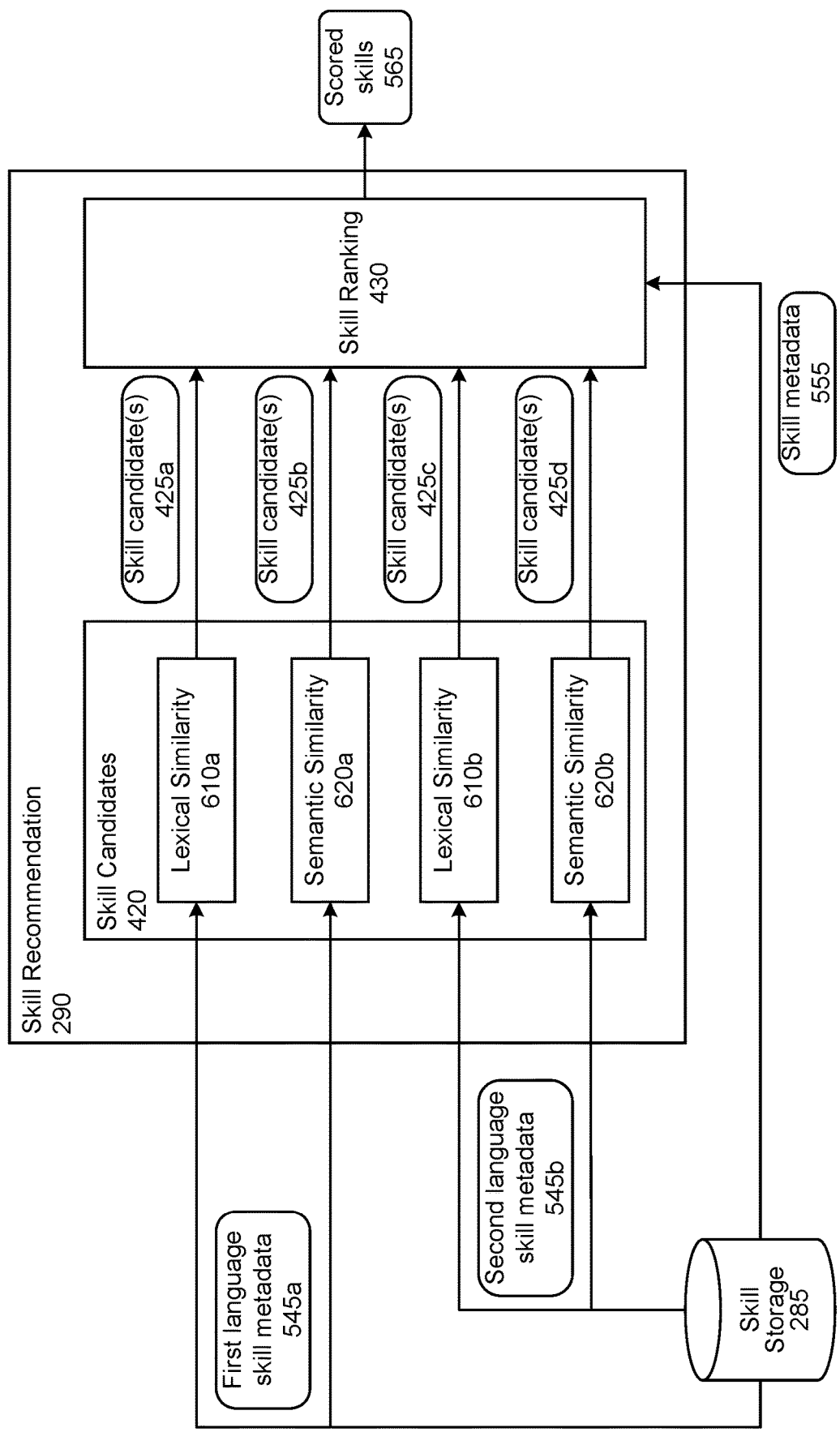
FIG. 6 is a conceptual diagram of how the skill recommendation component may process with respect to skills corresponding to various locales and/or languages, according to embodiments of the present disclosure.

Referring now to FIG. 6, it is described how the skill recommendation component 290 may process with respect to skills corresponding to various locales and/or languages. It is noted that, for the example of FIG. 6 and while not illustrated in FIG. 6, the natural language input data 505, the profile data 515, the skill interaction history data 525, and/or the natural language input history data 535 may be input to the skill recommendation component 290 as described above with respect to FIG. 5.

In some embodiments, the skill candidates component 420 may determine a locale based on the profile data 515. For example, the profile data 515 may indicate a locale represented in a user or group profile of the user 5 and/or a locale represented (e.g., as global positioning system (GPS) coordinates) in a device profile of the device 110. The skill candidates component 420 may query the skill storage 285 for skill metadata corresponding to skills associated with the locale. In some instances, the locale may be associated with skills corresponding to two or more different languages. For example, a single locale (e.g., the United States of America) may be associated with a first group of skills associated with a first language (e.g., English) and a second group of skills associated with a second language (e.g., Spanish). In this example, in response to the skill candidates component 420 querying the skill storage 285 with respect to the locale, the skill candidates component 420 may receive first language skill metadata 545a corresponding to the first group of skills associated with the first language, and second language skill metadata 545b corresponding to the second group of skills associated with the second language.

While FIG. 6 illustrates a single skill storage 285 storing skill metadata of skills corresponding to different languages, the present disclosure is not limited thereto. In some embodiments, the system 120/device 110 may store multiple skill storages 285, with each being associated with a different language. For example, the system 120/device 110 may store a first skill storage 285a storing skill metadata of skills corresponding to a first language, a second skill storage 285b storing skill metadata for skills corresponding to a second language, etc. In some embodiments, the system 120/device 110 may store multiple skill storages 285, with each being associated with a different locale. For example, the system 120/device 110 may store a first skill storage 285a storing skill metadata of skills corresponding to a first locale, a second skill storage 285b storing skill metadata for skills corresponding to a second locale, etc. In some embodiments, the system 120/device 110 may store multiple skill storages 285, with each being associated with a different locale/language pair. For example, the system 120/device 110 may store a first skill storage 285a storing skill metadata of skills corresponding to a first local/language pair, a second skill storage 285b storing skill metadata for skills corresponding to a second locale/language pair, etc.

In some embodiments, the skill candidates component 420 may determine a two or more languages based on the profile data 515. For example, the profile data 515 may indicate first and second (or more) languages represented in a user or group profile of the user 5. The skill candidates component 420 may query the skill storage 285 for skill metadata corresponding to skills associated with the first and second (or more) languages. In the example where the skill candidates component 420 queries the skill storage 285 for skills corresponding to the first and second languages, the skill candidates component 420 may receive first language skill metadata 545a corresponding to a first group of skills associated with the first language, and second language skill metadata 545b corresponding to a second group of skills associated with the second language.

In some embodiments, the skill candidates component 420 may determine a locale and two or more languages based on the profile data 515. For example, the profile data 515 may indicate a locale represented in a user or group profile of the user 5 and/or a locale represented (e.g., as global positioning system (GPS) coordinates) in a device profile of the device 110. In addition, the profile data 515 may indicate first and second (or more) languages represented in a user or group profile of the user 5. The skill candidates component 420 may query the skill storage 285 for skill metadata corresponding to skills associated with specific pairings of locale and language. For example, if the profile data 515 represents a locale, a first language, and a second language, the skill candidates component 420 may query the skill storage 285 for, and receive in response thereto, first skill metadata 545 corresponding to skills associated with the locale and the first language, and second skill metadata 545 corresponding to skills associated with the locale and the second language.

When the skill candidate component 420 is configured to only query the skill storage 285 with respect to specific locale/language pairings based on the locale and languages represented in the profile data 515, the skill candidates component 420 may not receive skill metadata corresponding to all skills associated with the locale represented in the profile data 515. For example, a locale may be associated with five languages and the profile data 515 may indicate three languages that are each associated with the locale in the skill storage 285. In this example, the skill candidate component 420 would receive first skill metadata corresponding to skills associated with the locale and first language, second skill metadata corresponding to skills associated with the locale and second language, and third skill metadata corresponding to skills associated with the locale and third language, but would not receive skill metadata for skills associated with the locale and fourth language or skills associated with the locale and fifth language. For further example, a locale may be associated with five languages and the profile data 515 may indicate three languages, only two of which are each associated with the locale in the skill storage 285. In this example, the skill candidate component 420 would receive first skill metadata corresponding to skills associated with the locale and first language and second skill metadata corresponding to skills associated with the locale and second language, but would not receive skill metadata for skills associated with the locale and third, fourth, and fifth languages, nor would the user receive skill metadata for skills associated with the third language represented in the profile data 515 language or skills associated with the locale and fifth language.

The skill candidate component 420 may be configured to perform lexical similarity processing and/or semantic similarity processing with respect to each skill metadata received by the skill candidates components 420. Lexical similarity processing may refer to processing performed to measure a degree to which words of the natural language input and sample natural language inputs of skills are similar. For example, a lexical similarity of 1 (or 100%) may mean a total overlap between vocabularies, whereas 0 may mean there are no common words. Semantic similarity processing may refer to processing to determine a metric defined over a set of documents or terms, where the idea of distance between items is based on the likeness of their meaning or semantic content as opposed to lexicographical similarity.

In the example of FIG. 6, where the skill candidates component 420 receives first language skill metadata 545a (corresponding to a first language, or locale and first language) and second language skill metadata 545b (corresponding to a second language, or locale and second language), the skill candidates component 420 may perform lexical similarity processing 610a with respect to the first language skill metadata 545a to determine one of more skill candidates 425a and/or semantic similarity processing 620a with respect to the first language skill metadata 545a to determine one or more skill candidates 425b. Likewise, the skill candidates component 420 may perform lexical similarity processing 610b with respect to the second language skill metadata 545b to determine one of more skill candidates 425c and/or semantic similarity processing 620b with respect to the first skill metadata 545d to determine one or more skill candidates 425d. The one or more skill candidates 425a and the one or more skill candidates 425b may include different skill identifiers, partially overlapping skill identifiers, or the same skill identifier(s). Similarly, the one or more skill candidates 425c and the one or more skill candidates 425d may include different skill identifiers, partially overlapping skill identifiers, or the same skill identifier(s).

In some embodiments, the one or more skill candidates 425a, the one or more skill candidates 425b, the one or more skill candidates 425c, and the one or more skill candidates 425d may each include one or more skill identifiers. In some other embodiments, the one or more skill candidates 425a, the one or more skill candidates 425b, the one or more skill candidates 425c, and the one or more skill candidates 425d may include one or more skill identifiers that are each associated with a respective relevancy (or other, such as a respective probability or confidence) score determined by the skill candidates component 420 for that skill identifier (e.g., for that corresponding skill).

The one or more skill candidates 425a, the one or more skill candidates 425b, the one or more skill candidates 425c, and the one or more skill candidates 425d may be input to the skill ranking component 430. The skill ranking component 430 may be configured to perform ranking processing across the one or more skill candidates 425a, the one or more skill candidates 425b, the one or more skill candidates 425c, and the one or more skill candidates 425d. Accordingly, since the one or more skill candidates 425a and the one or more skill candidates 425b correspond to a first language or locale and first language, and the one or more skill candidates 425c and the one or more skill candidates 425d corresponding to a second language or locale and second language, the skill ranking component 430 may perform ranking processing across different languages.

The processing of the skill ranking component 430 may not depend on the language represented in the natural language input. Rather, the skill ranking component 430 may be configured to try to recommend a best skill 225 for responding to the natural language input. In some instances, therefore, the top-scoring skill may not correspond to the same language represented in the natural language input (but nonetheless may still correspond to a language represented in a user or group profile associated with the user 5).

As mentioned previously, the skill candidates component 420 may implement search-based processing (i.e., lexical similarity processing 610). When performing lexical similarity processing 610, the skill candidates component 420 may implement a search engine (e.g., a keyword-based search engine) to retrieve one or more skill identifiers corresponding to one or more skills that may properly respond to the instant natural language input. To build the keyword-based search engine, the skill metadata 545, in the skill storage 285, may be indexed to include, for example, skill names, skill descriptions, system 120-/device 110-generated sample natural language inputs, and/or skill-provided sample natural language inputs. At retrieval time, the keyword-based search engine may determine a relevancy score between the instant natural language input and a skill as the sum of term frequency-inverse document frequency (TF-IDF) scores of every word in the instant natural language input. In some embodiments, the keyword-based search engine may return skill identifiers with top k relevancy scores.

The skill candidates component 420 plays an important role as it decides the performance upper bound of the skill recommendation component 290. One of the benefits of the skill candidates component 420 performing the foregoing search-based processing is that user feedback is not needed to train the skill candidates component 420, which may be especially helpful at the beginning of the development of the skill recommendation component 290, as user feedback data may not be accessible. However, it is noted that use of the foregoing search-based processing ignores the semantic meaning of the being-processed natural language input. For example, for the natural language input "play dog sound," the search engine may return matches for skills corresponding to sample natural language inputs of "dog sound" and "feed my dog," while "feed my dog" is irrelevant to the "play dog sound" natural language input.

In some embodiments, the search-based processing (i.e., the lexical similarity processing 610) of the skill candidates component 420 may be skill category-agnostic. For skill category-agnostic search-based processing, the skill metadata 545, in the skill storage 285, may be indexed with skill name, skill description, system 120-/device 110-generated sample natural language inputs, and/or skill-provided sample natural language inputs, and keywords as different fields. Given data (e.g., text data) related to the instant natural language input (and optionally one or more other aspects of a dialog to which the instant natural language input corresponds), the skill candidates component 420 may implement the search engine to determine relevance scores between the instant natural language input and the skills represented in the skill metadata 545 with respect to which the skill candidate component 420 is processing. The top k skills with highest relevance scores may be returned, in some embodiments. A relevance score between the instant natural language input and a skill may be computed as the sum of TF-IDF scores of each token/word in the instant natural language input.

In some embodiments, the skill candidates component 420 (and more particularly the search engine implemented thereby) may perform skill category-aware search-based processing (i.e., the lexical similarity processing 610). To enable skill category-aware search-based processing, in addition to the skill metadata 545, in the skill storage 285, being indexed with skill name, skill description, system 120-/device 110-generated sample natural language inputs, and/or skill-provided sample natural language inputs, and keywords as different fields, the skill metadata 545 is also indexed with skill category as a field (and optionally skill subcategory as a field).

Figure 7:
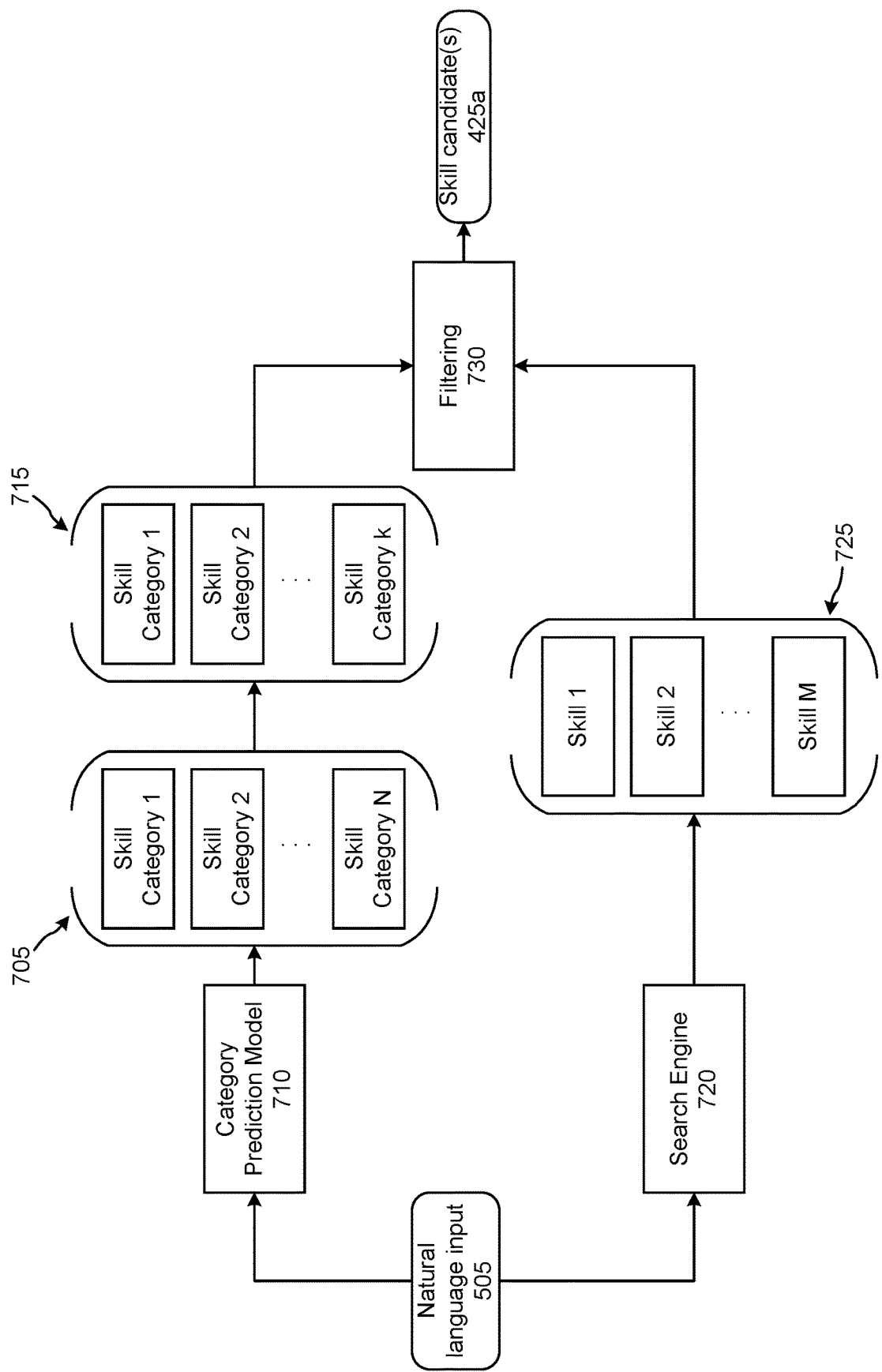
FIG. 7 is a conceptual diagram illustrating skill category-aware search-based processing that may be performed by a skill candidates component of the skill recommendation component, according to embodiments of the present disclosure.

As illustrated in FIG. 7, the skill category-aware search-based processing may involve a two-stage elastic search (TSES) in some embodiments. The two stages of the TSES may include category prediction and skill retrieval. The goal of the TSES is to find relevant skill candidates given a natural language input. At the first stage, the natural language input data 505 is input to a category prediction model 710, and the output from the category prediction model 710 may be a list 705 of skill categories. While FIG. 7 shows up to skill category N, one skilled in the art will appreciate that the list 705 skill categories may have varying numbers of skill categories depending on the situation. The list 705 of skill categories may be ranked by probability scores, with each skill category be associated with a respective probability score representing a probability that the instant natural language input corresponds to the skill category. The category prediction model may be an art-known/industry-known machine learning (ML) model configured using art-known/industry-known techniques.

At the second stage, the skill candidates component 420 may select a top-k 715 relevant skill categories from the list 705 of skill categories, and the skill candidates component 420 may use the search engine (referenced as 720 in FIG. 7) to query an elastic search service to obtain a list 725 of skills potentially relevant to processing the natural language input. The skill candidates component 420 may implement a filtering component 730 configured to select, from the list 725 of skills, only skill candidates 425a corresponding to the top-k 715 skill categories.

As described above, the search-based processing (i.e., lexical similarity processing 610) performed by the skill candidates component 420 may be skill category-agnostic or skill category-aware. In any event, the search-based processing may be language agnostic. For example and with reference to FIG. 6, the search-based processing may be performed with respect to the first language skill metadata 545a corresponding to a first language and the second language skill metadata 545b corresponding to a second language. As a result, the search-based processing of the skill candidates component 420 may output skill candidates 425a corresponding to the first language and skill candidates 425c corresponding to the second language.

As mentioned previously, the skill candidates component 420 may implement model-based processing (i.e., semantic similarity processing 620) in addition to or instead of implementing the foregoing search-based processing (i.e., lexical similarity processing 610). The skill candidates component 420 may implement a ML model configured to predict probabilities of skills properly responding to the instant natural language input, and the ML model may select and output a top-k skills with the highest probability scores. Unlike the search-based processing of the skill candidates component 420 as described above, the model-based processing of the skill candidates component 420 may capture the semantic meaning of natural language inputs.

The ML model of the skill candidates component 420 may be implemented as one of various types of ML models. In some embodiments, the ML model may be a deep neural network (DNN)-based model configured to find a N-best skill list given various input data. A relabeling technique, incorporating dialog information and multi-task learning (with added tasks of predicting skill category and optionally subcategory) may be used to improve the ML model's performance (as discussed elsewhere herein).

Figure 8:
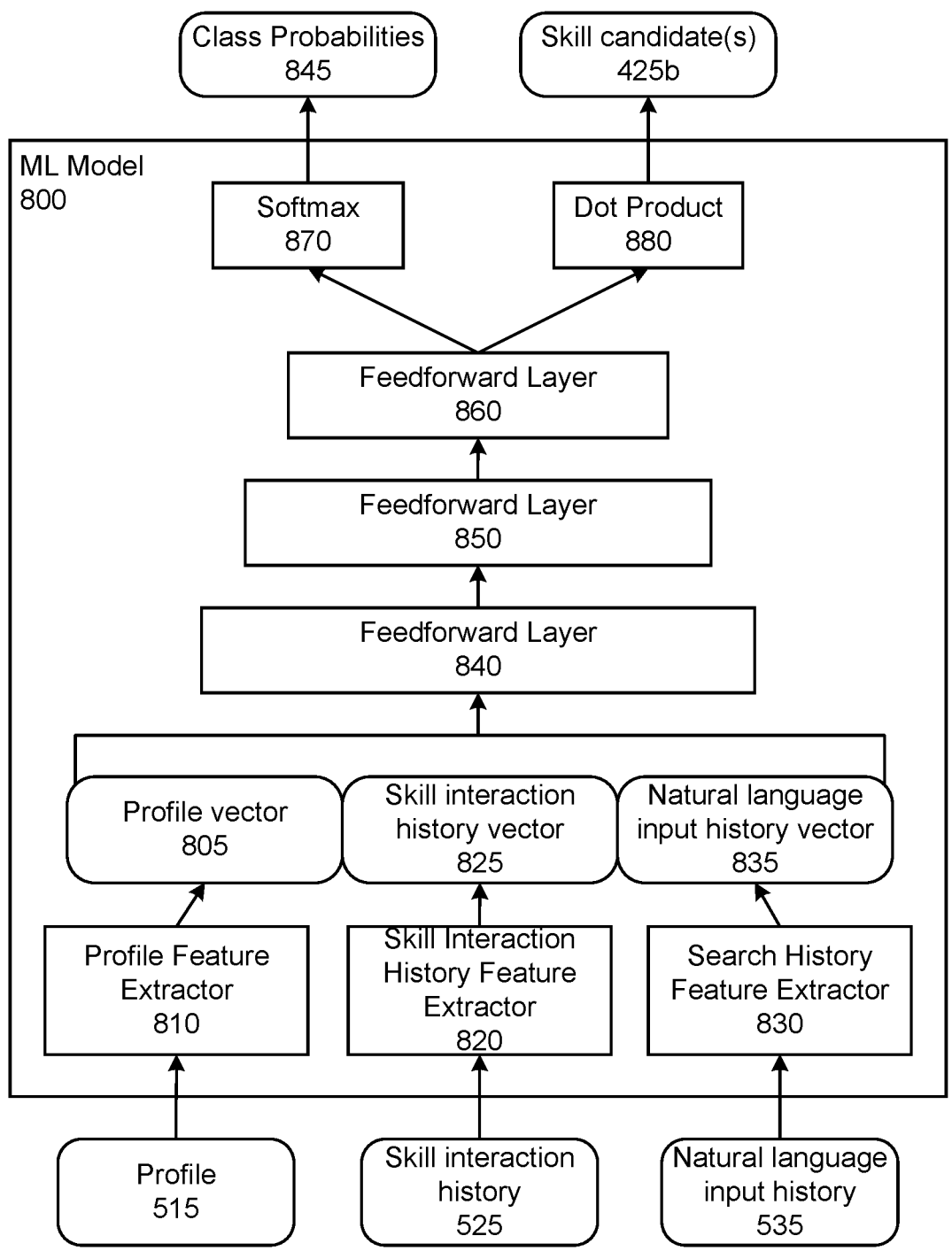
FIG. 8 is a conceptual diagram of a machine learning (ML) model that may be implemented by the skill candidates component, according to embodiments of the present disclosure.

FIG. 8 illustrates an example architecture of the ML model 800 of the skill candidates component 420. The ML model 800 includes one or more feature extractors for generating one or more vectors representing one or more input data. For example, the ML model 800 may include a profile feature extractor 810 configured to generate a profile vector 805 representing the profile data 515. For further example, the ML model 800 may include a skill interaction history feature extractor 820 configured to generate a skill interaction history vector 825 representing the skill interaction history data 525. In another example, the ML model 800 may additionally include a natural language input history feature extractor 830 configured to generate a natural language input history vector 835 representing the natural language input history data 535. Alternatively, the ML model 800 may include a single feature extractor configured to generate the profile vector 805, the skill interaction history vector 825, and the natural language input history vector 835. In some instances, the ML model 800 only generate a portion of the profile vector 805, the skill interaction history vector 825, and the natural language input history vector 835 due to a lack of unavailable corresponding input data.

The ML model 800 may be a neural network (e.g., a DNN) including a plurality of feedforward layers. In the example of FIG. 8, the ML model 800 includes a feedforward layer 840, a feedforward layer 850, and a feedforward layer 860. However, it will be appreciated that the present disclosure is not limited thereto. The feedforward layers of the ML model 800 may have various activation functions including, for example, a binary step function, a linear function, a sigmoid function, a hyperbolic tangent function, a rectified linear unit (ReLU) function, or a leaky ReLU function. In some embodiments, it may be beneficial to implement a ReLU function, a piecewise linear function that outputs the input if it is positive, otherwise, the function outputs zero.

The last feedforward layer of the ML model 800 (i.e., the feedforward layer 860 in FIG. 8) outputs skill vectors (representing skills) to the output layer. During training, the output layer may be a softmax function 870, which is used to normalize the output of the ML model's network (i.e., the feedforward layers 840/850/860) to a probability distribution 845 over predicted output classes. At runtime, the output layer may be a dot product function 880, which is used to calculate a weighted sum of the vectors output by the ML model's network (i.e., the feedforward layers 840/850/860). Applying the foregoing to FIG. 6, the dot product function 880 produces the skill candidates 525b/425d.

In some embodiments, the ML model 800 may be trained using relabeling. For example, relabeling may be done by performing a k-nearest neighbors (kNN) search of the nearest neighbor(s) of natural language inputs in the training dataset. A pre-trained embedding (e.g., a pre-trained Bidirectional Encoder Representations from Transformers (BERT) embedding) of sample natural language inputs of skills may be obtained. Next, for each sample natural language input (with positive or negative user feedback information), all natural language inputs that are in its 100 nearest neighbor, based on cosine similarity of BERT embeddings, may be found. Then, the natural language inputs with cosine similarities below a threshold may be filtered out. A list of corresponding skills may be collected from the kNN of the target natural language input, and all skills with matched times below a threshold may be filtered out.

Multi-task learning is often a useful technique to achieve better model performance by optimizing multiple objectives simultaneously with shared layers. For the present disclosure, besides the ground truth of skill identifier, the ML model 800 may also be aware of skill category and subcategory, and both of them can be treated as additional objectives. By optimizing all objectives simultaneously, a more robust model may be obtained by incorporating side information. It also improves the accuracy of skill identifier prediction.

Figure 9:
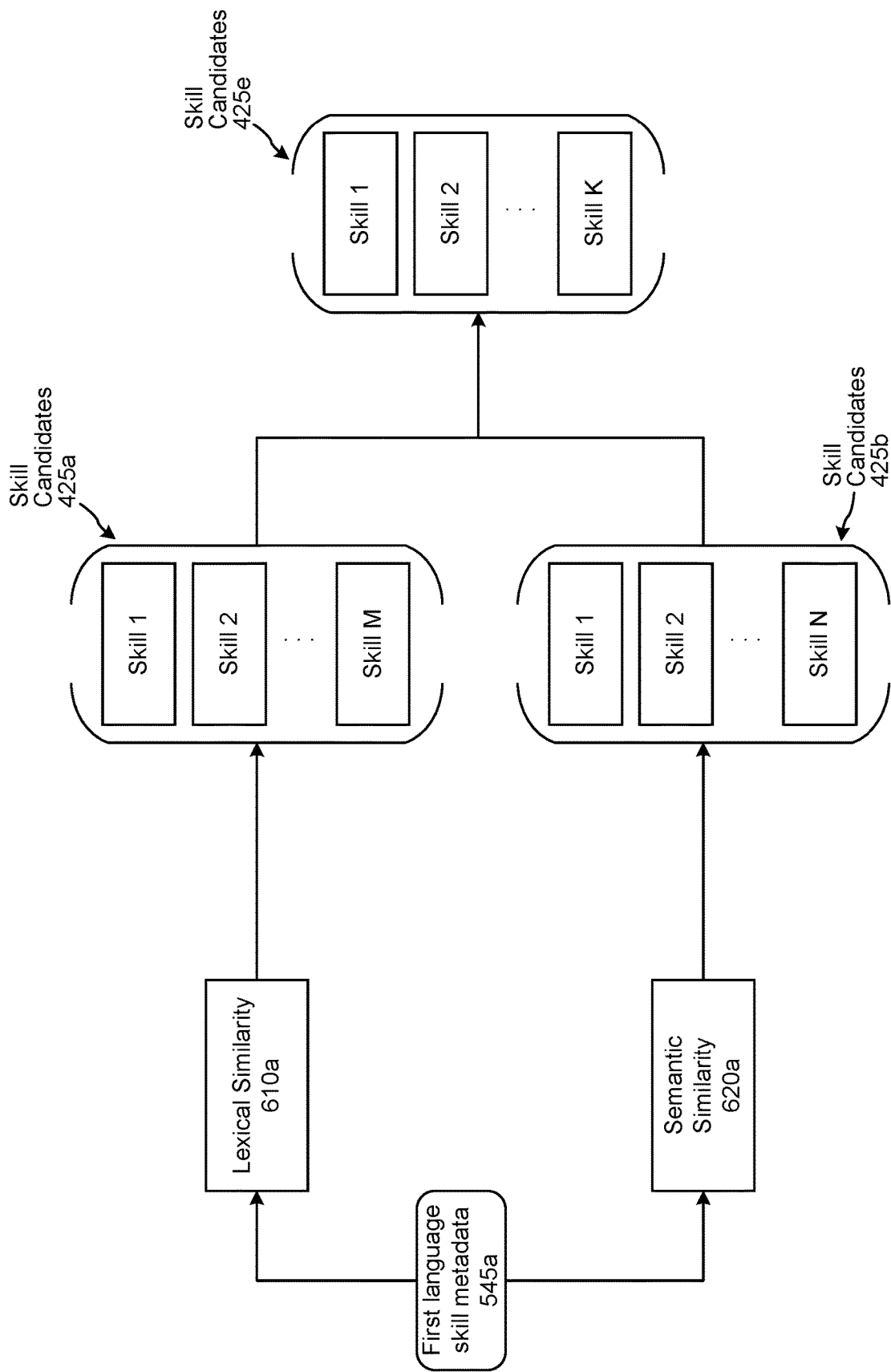
FIG. 9 is a conceptual diagram illustrating how search-based and model-based processing outputs of the skill candidates component may be unified prior to being input to a skill ranking component of the skill recommendation component, according to embodiments of the present disclosure.

As described above, in some embodiments the skill candidates component 420 may perform both search-based processing (i.e., lexical similarity processing 610) and model-based processing (i.e., semantic similarity processing 620) with respect to the same skills (i.e., the same skill metadata 545). As a result, in some instances the outputs of the search-based processing and the model-based processing may include overlapping skills (e.g., overlapping skill identifiers. FIG. 9 illustrates how the search-based and model-based processing outputs of the skill candidates component 420 may be unified prior to being input to the skill ranking component 430 of the skill recommendation component 290.

As illustrated in FIG. 9, the skill candidates component 420 may perform search-based lexical similarity processing 610a on the first language skill metadata 545a to generate the skill candidates 425a. The skill candidates component 420 also performs model-based semantic similarity processing 620a on the first language skill metadata 545a to generate the skill candidates 425b. In the example of FIG. 9, the skill candidates component 420 may determine that the skill candidates 425a and the skill candidates 425b include at least one same skill (i.e., skill identifier). Thus, the skill candidates component 420 may generate skill candidates 425e from the skill candidates 425a and the skill candidates 425b, with the skill candidates 425e includes only non-duplicative skills (i.e., skill identifiers) from the skill candidates 425a and skill candidates 425b. In other words, the skill candidates 425e may not include a skill (i.e., skill identifier) that was represented in both the skill candidates 425a and the skill candidates 425b. In the example of FIG. 9, the candidates 425e, and not the skill candidates 425a and skill candidates 425b, may be input to the skill ranking component 430. In some embodiments, the skill candidates 425a and the skill candidates 425b may be input to the skill ranking component 430, and the skill ranking component 430 may be configured to generate the skill candidates 425e as described above.

One skilled in the art will appreciate that FIG. 9 is merely illustrative, and that other ways of combining the skill candidates 425a and the skill candidates 425b may be used. For example, the skill candidates component 420 may select a top n1 skills (i.e., skill identifiers) from the skill candidates 425a and a top n2 skills (i.e., skill identifiers) from the skill candidates 425b, and simply combine the selected top n1 and n2 skills (i.e., skill identifiers) into the skill candidates 425e.

Figure 10:
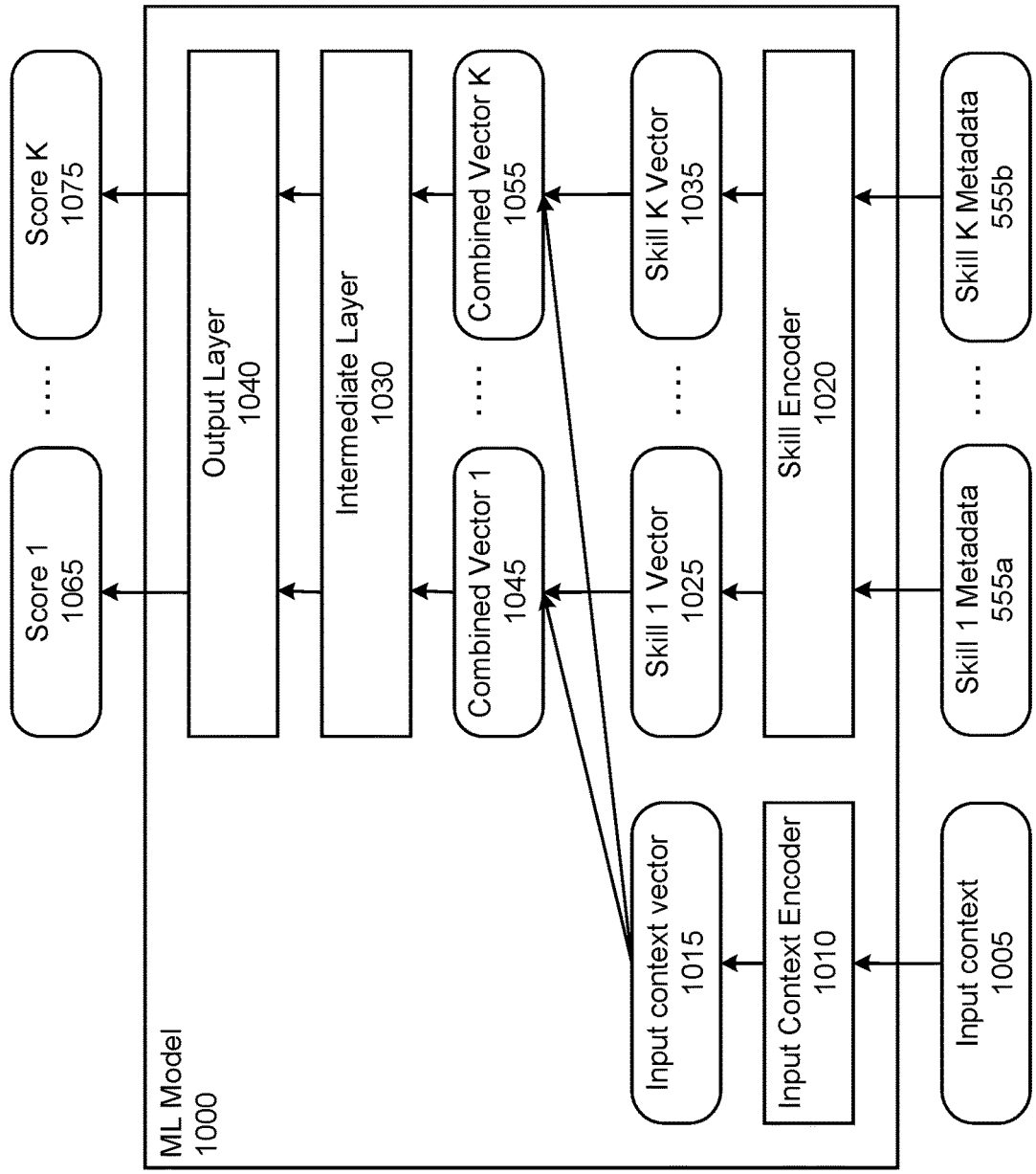
FIG. 10 is a conceptual diagram of a ML model that may be implemented by the skill ranking component, according to embodiments of the present disclosure.

Referring now to the skill ranking component 430, FIG. 10 illustrates an example ML model 1000 that may be implemented by the skill ranking component 430. In general, the ML model 1000 takes in the skill candidates 425 (i.e., skill identifiers) generated by skill candidates component 420, and outputs a ranked list of skills (i.e., skill identifiers) based on the information corresponding to the instant natural language input and skill-specific information. In some embodiments, the ML model 1000 may be a deep learning model with a listwise ranking loss function.

The skill ranking component 430 may query the skill storage 285 for skill metadata 555 for each skill (i.e., skill identifier) output by the skill candidates component 420. In the example of FIG. 10, the skill ranking component 430 may receive metadata 555a through 555b for skills 1 through k. Each portion of skill metadata 555 corresponding to a single skill may include, for example, a skill name, a skill description, one or more example natural language inputs for invoking the skill, a skill category, and/or a skill subcategory. The skill metadata 555a-555b may be input to a skill encoder 1020 configured to generate corresponding skill vectors 1025-1035. In some embodiments, the skill encoder 1020 may be a BERT encoder.

Input context data 1005 is also input to the ML model 1000. The Input context data 1005 may include the natural language input data 505, the profile data 515, the skill interaction history data 525, and/or the natural language input history data 535. The ML model 1000 process the input context data 1005 using an input context encoder 1010 to generate a corresponding input context vector 1015. In some embodiments, the input context encoder 1010 may be a BERT encoder.

The ML model 1000 may concatenate the input context vector 1015 with each skill vector 1025-1035 to form a sequence of combined vectors 1045-1055, with each combined vector including the input context vector 1015 and a different skill vector. In the example of FIG. 10, the sequence of combined vectors 1045-1055 may be input to an intermediate layer 1030 configured to capture sequential information within the combined vectors 1045-1055. In some embodiments, the intermediate layer 1030 may be a Long Short-Term Memory (LSTM) layer. In some embodiments, the intermediate layer 1030 may be a bidirectional LSTM layer. The outputs from the intermediate layer 1030 may be converted to scores 1065-1075 (in some embodiments probability scores) using an output layer 1040, which may implement a softmax function. As a result, each skill (and more particularly skill identifier) input to the skill ranking component 430 may have a corresponding score generated by the ML model 1000. The skill ranking component 430 may rank the skills (i.e., skill identifiers) input thereto based on the scores output by the ML model 1000.

In some embodiments, a listwise ranking objective function may be used. For a list of skill candidates, user feedback for the skill candidates may be represented as $y=\{y_1, \ldots, y_k\}$, and the predicted probabilities by the ML model 1000 may be represented as $s=\{s_1, \ldots, s_k\}$. The objective function may be formulated as:

$$L(y, s) = \frac{1}{k}\sum_{i=1}^{k}[-y_i \log(s_i) - (1 - y_i)\log(1 - s_i)]. \qquad \text{Equation 1}$$

Compared to pointwise and pairwise rankers, which treat each skill independently, listwise ranking models use the whole list so that it can capture correlation between the items/skills in the list. Another advantage of using a listwise model is efficiency. Pointwise models need to encode the natural language input k times, while a listwise model only needs to encode the natural language input once. Online experiments also show that listwise models reduce latency significantly.

The ML model 1000 may be trained using various techniques. In some embodiments, the ML model 800 may be trained using collaborative data relabeling to facilitate robust ranking. One challenge in training the ML model 800 is partial observation. In purely voice-based systems, it may be desirable to present only the top-one skill to the user. Presenting multiple skills to the user may result in an undesirable user experience due to the user being unable to view the recommended skills on a display. In such voice-based systems, it is difficult (if not impossible) to get user feedback with respect to the second, third, fourth, etc. recommended skill. Without user feedback for such skills, it is hard to build a ranker model as ranking, in essence, is about comparing. To resolve the partial observation problem, the present disclosure details a collaborative data relabeling approach. This approach answers a counterfactual question of what if the customer was presented with another skill. To answer this question, a k-nearest neighbor-based matching method may be used to train the ML model 1000. This method matches an instant natural language input to a similar natural language input, and uses user feedback associated with the similar natural language input to relabel the scored skill candidates output by the skill candidates component 420.

Figure 11:
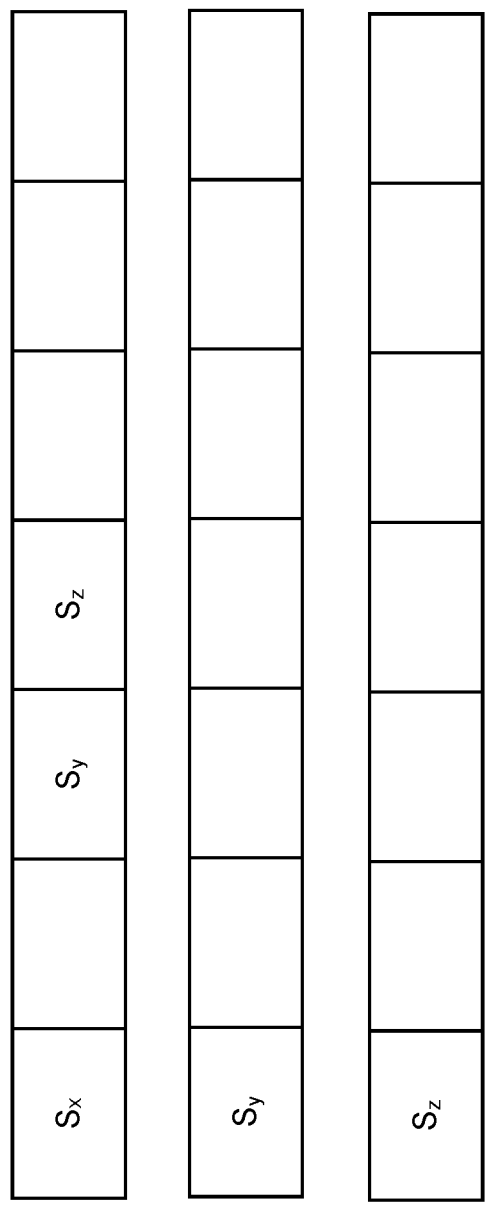
FIG. 11 is a conceptual diagram of a k-nearest neighbor-based matching method that may be used by the skill ranking component, according to embodiments of the present disclosure.

FIG. 11 conceptually illustrates the k-nearest neighbor-based matching method of the present disclosure. In FIG. 11, a list of skill candidates (represented by the topmost sequence of boxes) were determined for user x, and skill $s_x$ was presented to user x. Therefore, no user feedback was received for skills $s_y$ and $s_z$ from user x. However, it may be determined that users y and z where presented with skills $s_y$ and $s_z$, respectively. The user feedback obtained from users y and z with respect to skills $s_y$ and $s_z$, respectively, may be used to relabel skills $s_y$ and $s_z$ in user x's skill candidates. By performing this relabeling, the ML model 1000 is able to learn to compare skills.

User feedback can be noisy (i.e., interpreting the user feedback can be imprecise), which can result in noisy labels. Noisy labels can hurt performance of the ML model 1000. Another advantage of the k-nearest neighbor-based matching method is that it mitigates noisy labeling issues by using multiple similar natural language inputs (of various users) to determine a label. Several users' feedback to a particular presented skill may be determines and aggregated, with the relabeling taking into consideration the aggregate of the users' feedback. Thus, the label considered by the ML model 1000 may be more reliable that if the label was determined from feedback provided by a single user.

Recommendation systems are confronted with an overfitting problem that only a small portion of items are recommended to users, which can hurt user satisfaction as the users can quickly get bored by always being suggested with similar types of items. The skill recommendation component 290 of the present disclosure may also be confronted with this problem if not configured properly. This may be especially problematic for skills that serve the same intent but with different content. For example, when users ask to play a soothing sound to help the users sleep, always suggesting one kind of sleep sound can cause users to become bored, while there may exist many types of sleep skills configured to output different soothing sounds. Suggesting diverse skills can improve user satisfaction. The k-nearest neighbor-based matching method of the present disclosure improves diversity by relabeling skill candidates that serve the same intent, which may force the ML model 1000's predictive distribution to be dispersed among more skills.

As described, the k-nearest neighbor-based matching method of the present disclosure may be used to relabel a skill candidate by using the response of a neighboring natural language input. The k-nearest neighbor-based matching method of the present disclosure is interpretable in the sense that when relabeling a skill candidate, the ranking component 430 may know why a skill candidate is getting relabeled by inspecting the neighboring natural language input. The benefit of this interpretability is that if the neighboring utterance does not make sense, the relabeled label, corresponding to the neighboring natural language input, can be discarded.

The similarity of two natural language inputs (i.e., the instant natural language input and a previous natural language input of the same or a different user) may be measured using various approaches. For example, Jaccard similarity may be used. In this approach, given a natural language input, the output from the skill candidates component 420 may be n skill candidates. If two natural language inputs are similar, their corresponding skill candidates should also be similar. Therefore, the similarity between the natural language inputs can be measured by comparing the skill candidates of the natural language inputs. For utterances i and j, their skill candidates may be $sc_i$ and $sc_j$, respectively. The Jaccard similarity score between utterances i and between $sc_i$ and $sc_j$ may be represented as:

$$sim(i, j) = \frac{sc_i \cap sc_j}{sc_i \cup sc_j}. \quad \text{Equation 2}$$

In another example, cosine similarity may be used to measure the similarity of two natural language inputs. Each natural language input may be treated as a document, and term frequency and inverse document frequency may be computed for each word in a natural language input. Each natural language input may be represented as a vector (e.g., generated using a BERT model tuned using data with a multi-task objective function, such as intent classification and named entity recognition). A entry in the vector may represent the TF-IDF value of the corresponding word. The similarity score of the two natural language inputs may be computed as the cosine similarity of their vectors.

Figure 12:
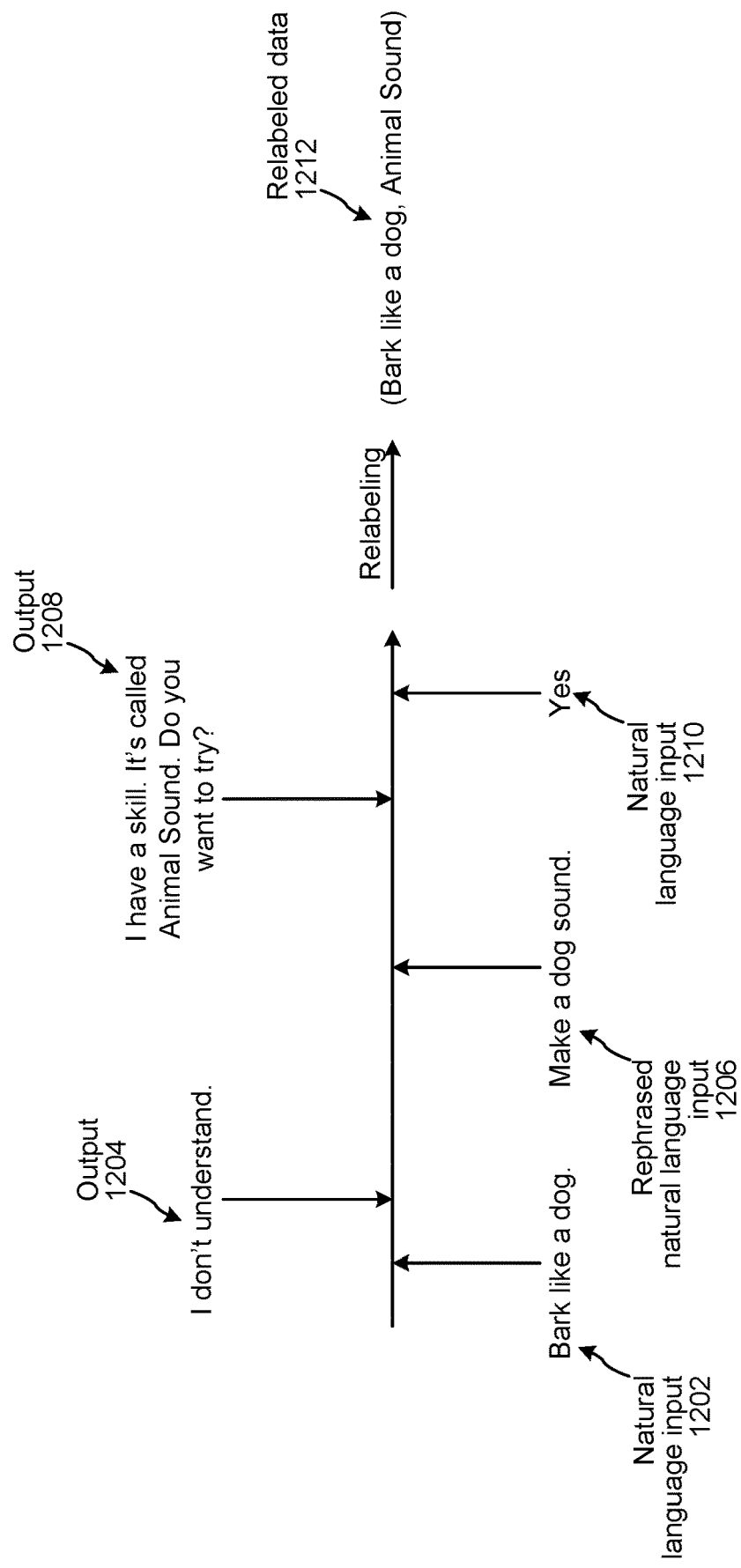
FIG. 12 is a conceptual diagram of how rephrase-based relabeling may be performed, according to embodiments of the present disclosure.

When the system 120/device 110 performs an incorrect action (e.g., due to the original natural language input being noisy), the user may rephrase the natural language input in an effort to get the system 120/device 110 to perform a desired action. FIG. 12 conceptually illustrates rephrase-based relabeling. As illustrated in FIG. 12, the device 110 may receive a natural language input 1202 of "bark like a dog." In the example of FIG. 12, the system 120/device 110 may not be configured to understand the natural language input "bark like a dog" and, as a result, may generate an output 1204 corresponding to "I don't understand" or the like. After outputting the output 1204, the device 110 may receive a rephrased natural language input 1206 corresponding to "make a dog sound." In the example of FIG. 12, the system 120/device 110 may be configured to determine the rephrased natural language input 1206 corresponds to an animal sound skill, and may generate an output 1208 of "I have a skill. It's called Animal Sound. Do you want to try?" or the like. Thereafter, the user 5 may affirm the output 1208 with a natural language input 1210 of "yes" or the like. Based on the foregoing dialog, the system 120/device 110 may perform rephrase-based relabeling to generate relabeled data 1212 that associates the original natural language input 1202 with the skill known to the system 120/device 110 to be associated with the rephrased natural language input 1206. According to the present disclosure, the foregoing rephrase-based relabeling method may be used to train the ML model 1000.

As part of the rephrase-based relabeling method, rephrased natural language inputs are detected. For example, given an utterance ut, the task of rephrase detection may be to find an utterance after ut in the same dialog that is semantically similar to ut. This may be based on the assumption that users tend to rephrase their requests in a conversation with the system 120/device 110 until the system 120/device 110 performs the expected action. For purposes of rephrase detection, a dialog is a sequence of utterances denoted as $\{u_1, \ldots, u_t, \ldots, u_N\}$. Assuming $u_t$ is the original utterance, a rephrase may be expected to be found in $\{u_{t+1}, \ldots, u_N\}$. A utterance is considered as a rephrase of the original utterance if the utterances are semantically similar. To measure the similarity of two utterances, the utterances may be encoded into embedding vectors using a BERT encoder, and the similarity score may be computed as the cosine similarity between the two embedding vectors. A future utterance is regarded as the rephrase of the original utterance if the utterances' similarity score is above a certain threshold, with the threshold being configurable. The rephrase-based relabeling method of the present disclosure may use the invoked skill of the rephrase utterance (or rephrase non-spoken natural language input) as a ground truth label of the original utterance (or original non-spoken natural language input).

Another challenge is that skill distribution may be imbalanced for different languages. Some languages have much fewer skills than others. A language with limited skills may be referred to as a target language, and a language with a better skill supply may be referred to as a source language. To reduce user friction in target languages, skills from source languages may be recommended to the user. To build a model that can recommend skills from source languages to target languages, shard-based co-training may be used. This method may first chunk data into shards, where each shard contains user data of both languages, and then iteratively train the model on one shard and to generate new pseudo labels for the next shard. This iterative process may make the model absorb information from multiple languages and transfer useful information from one language to another and help the languages with limited skills. Such is illustrated in FIG. 13.

Figure 13:
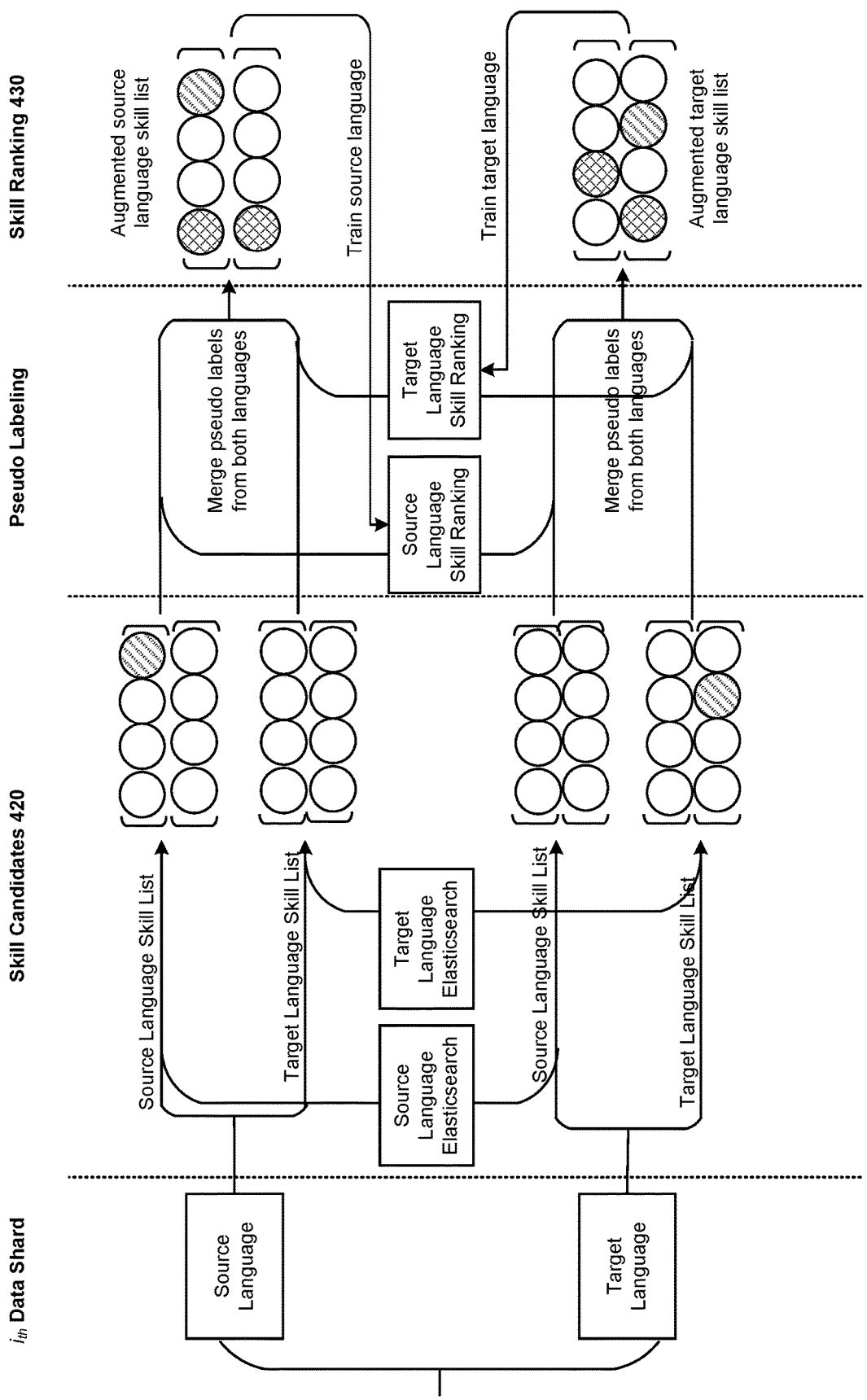
FIG. 13 is a conceptual diagram of a shard-based co-training method, according to embodiments of the present disclosure.

Referring to FIG. 13, for each training request in either source language or target language, skill candidates may be calculated in both languages. The cross-language training data may be evenly chucked into shards (portions). A source language skill ranking model and a target language skill ranking model may be separately maintained and optimized. In shard/, the source language skill ranking model may be trained on the ith source language data shard, and the target language skill ranking model may be trained on the ith target language data shard. The two trained models may predict on the next shard data in a cross-language manner, which may contain four prediction steps:

(1) The source language trained model may predict on the i+1 source language data shard requests based on their skill candidates result on source language skills;

(2) The source language trained model may predict on the i+1 target language data shard requests based on their skill candidates result on source language skills;

(3) The target language trained model may predict on the i+1 source language data shard requests based on their skill candidates result on target language skills; and (4) The target language trained model may predict on the i+1 target language data shard requests based on their skill candidates result on target language skills.

For the i+1 data shard in both source language and target language, the predicted labels from source language trained model and target language trained model may be combined and added to the related i+1 data shard. The two trained models may keep fine-tuning on the i+1 data shard in both language. The foregoing processing may be run iteratively until all data is trained although only the ith data shard is illustrated in FIG. 13. In some embodiments, the foregoing processing of FIG. 13 may be performed for different locales. Manipulation of the foregoing processes to be with respect to locales is within the knowledge of one skilled in the art.

In the model of FIG. 13, the model is wrapped in a co-training framework by learning two separate skill recommenders for two languages interactively and simultaneously. Specifically, the skill candidates component 420 may employ an Elasticsearch to retrieve top K skill candidates, and the skill ranking component 430 co-trains two language-specific (and optionally locale specific) ML models (e.g., neural models) for skill recommendation. The pseudo labeling portion of FIG. 13 integrates suggested skills from both languages, with is often more reliable than single language suggested skills, especially for recommending cross-language skills. In each training iteration, the model trains and predicts on a new data shard, which keeps absorbing new knowledge from both languages without redundancy.

To obtain more labeled data for training, two strategies are jointly applied on each cross-language data shard, including biased upsampling and pseud labeling. Biased upsampling reinforces the exploitation on natural language inputs with labeled skills, and pseudo labeling explores other potentially relevant skills for the natural language input. As pseudo labeled skills predicted by the skill ranking component 430 may be less reliable with potential prediction errors, biased upsampling may be applied first to only duplicate the data with ground truth labels. Pseudo labeling may be applied afterwards to avoid upsampling natural language inputs with only pseudo labels.

Figure 14:
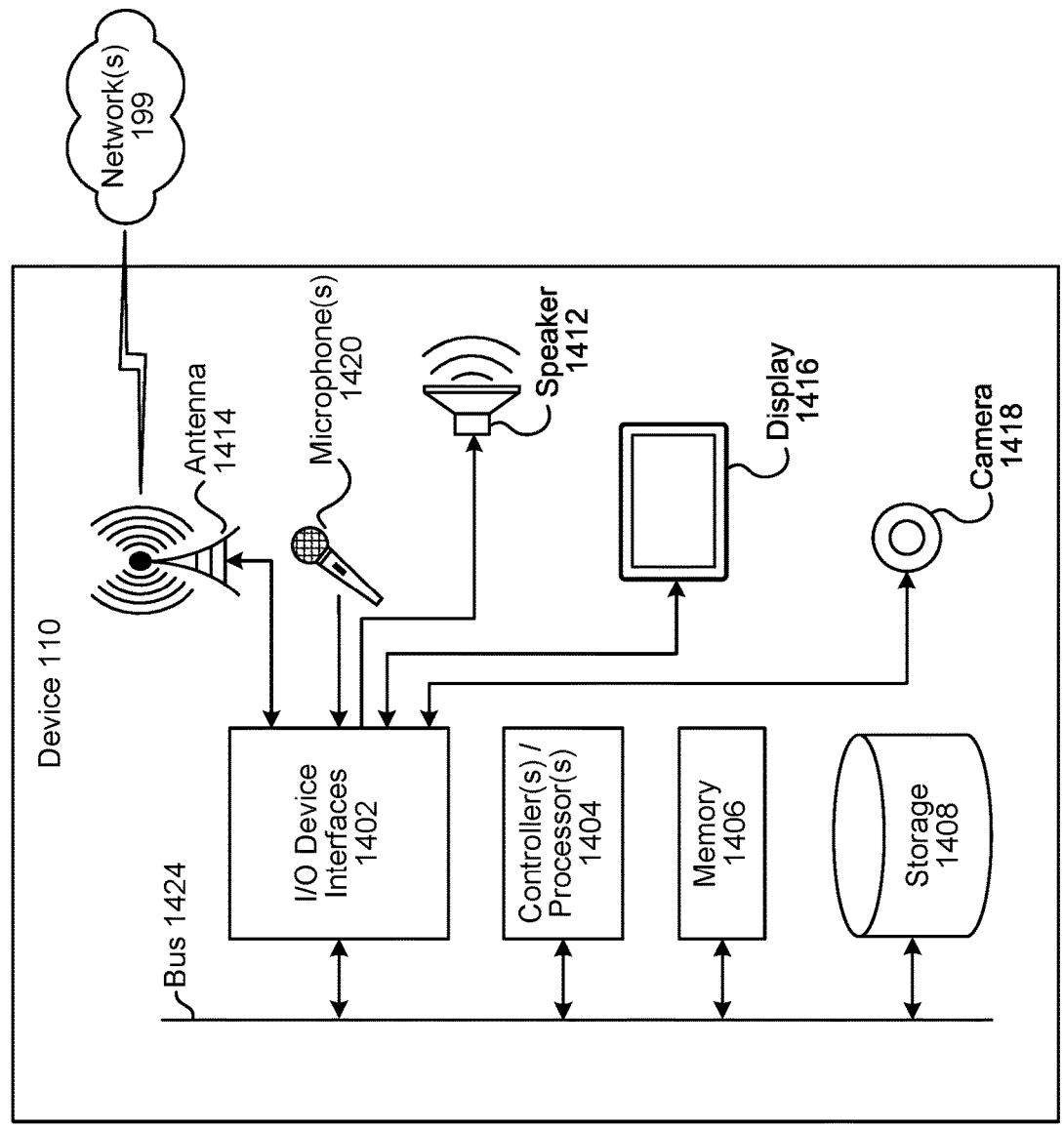
FIG. 14 is a block diagram conceptually illustrating example components of a device, according to embodiments of the present disclosure.
Figure 15:
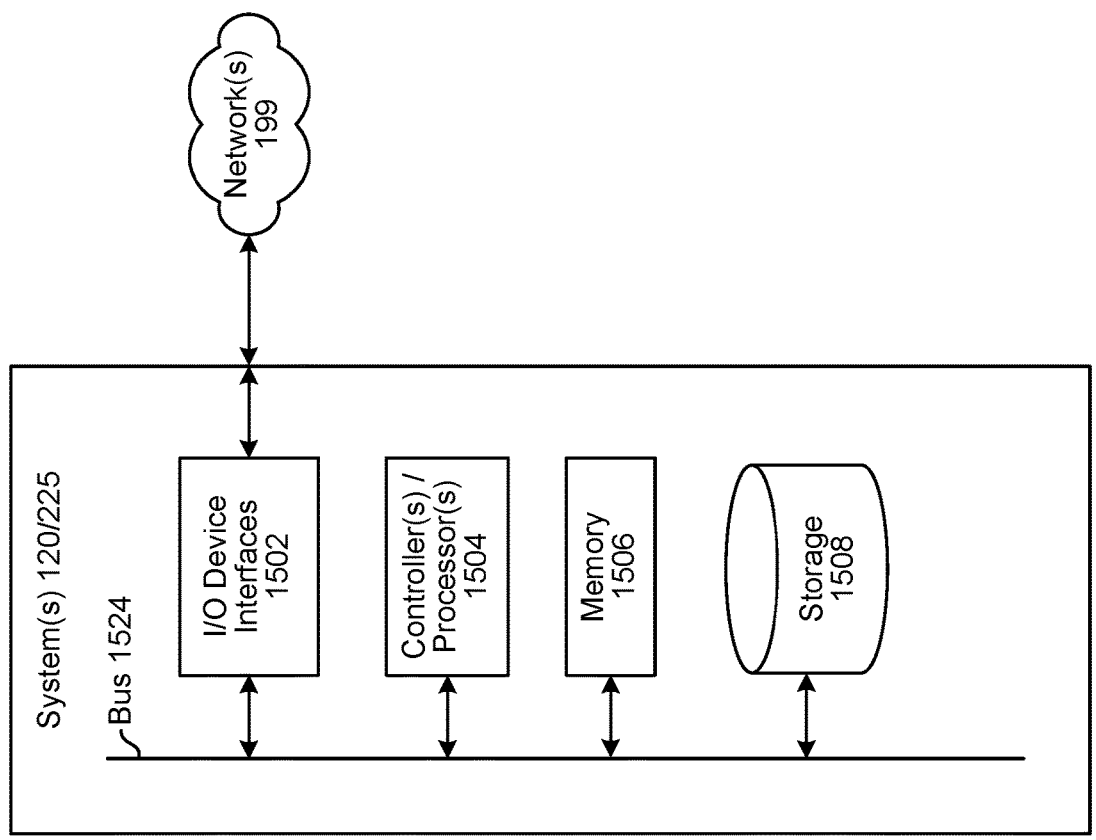
FIG. 15 is a block diagram conceptually illustrating example components of a system, according to embodiments of the present disclosure.

FIG. 14 is a block diagram conceptually illustrating a device 110 that may be used with the system 120. FIG. 15 is a block diagram conceptually illustrating example components of a remote device, such as the system 120 or a skill 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/225) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the system 100 of the present disclosure, such as one or more systems 120 and/or one or more skills 225. In operation, each of these systems may include computer-readable and computer-executable instructions that reside on the respective device (120/225), as will be discussed further below.

Each of these devices (110/120/225) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120/225) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1402/1502).

Computer instructions for operating each device (110/120/225) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120/225) includes input/output device interfaces (1402/1502). A variety of components may be connected through the input/output device interfaces (1402/1502), as will be discussed further below. Additionally, each device (110/120/225) may include an address/data bus (1424/1524) for conveying data among components of the respective device. Each component within a device (110/120/225) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1414, the input/output device interfaces 1402 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device 110, the system 120, and/or the skill 225 may include their own dedicated processors, memory, and/or storage. Alternatively, one or more of the components of the device 110, the system 120, and/or the skill 225 may utilize the I/O interfaces (1402/1502), processor(s) (1404/1504), memory (1406/1506), and/or storage (1408/1508) of the device 110, the system 120, or the skill 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and the skill 225, as described herein, are illustrative, and may be located as a stand-alone device or may be included, in whole or in part, as a component of a larger device or system.

Figure 16:
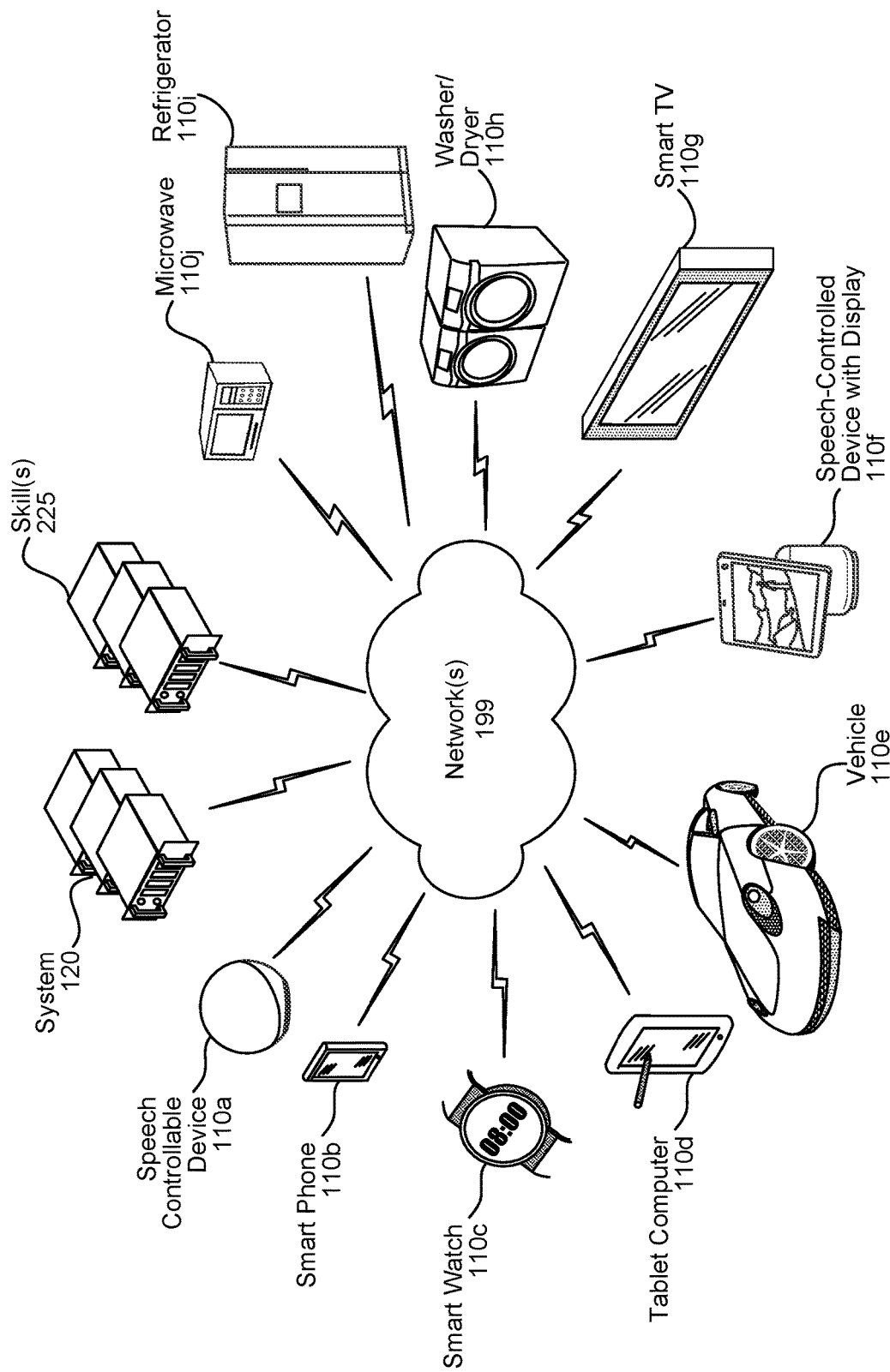
FIG. 16 illustrates an example of a computer network for use with the overall system, according to embodiments of the present disclosure.

As illustrated in FIG. 16, multiple devices (110*a*-110*j*, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110*a*, a smart phone 110*b*, a smart watch 110*c*, a tablet computer 110*d*, a vehicle 110*e*, a speech-controllable display device 110*f*, a smart television 110*g*, a washer/dryer 110*h*, a refrigerator 110*i*, and/or a microwave 110*j* may be connected to the network(s) 199 through a wireless service provider, over a Wi-Fi or cellular network connection, or the like. Other devices are included as network-connected support devices, such as the system 120, the skill 225, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving audio data corresponding to a first spoken natural language input;
performing speech processing on the audio data to generate NLU output data corresponding to the first spoken natural language input, the NLU output data including at least an intent indicator representing the first spoken natural language input;
determining user profile data associated with the audio data;
determining the user profile data indicates a first language and a second language understood by a user;
determining first metadata corresponding to at least a first skill corresponding to the first language;
determining second metadata corresponding to at least a second skill corresponding to the second language;
determining skill history data associated with the user profile data, the skill history data representing at least one skill that previously executed;
determining input history data associated with the user profile data, the input history data representing at least a second spoken natural language input;
determining, using a search engine, a first lexical similarity between words in the first metadata and words in the first spoken natural language input;
determining, using the search engine, a second lexical similarity between words in the second metadata and words in the first spoken natural language input;
processing, using a machine learning (ML) model, the user profile data, the skill history data, and the input history data to determine a first semantic similarity between the first metadata and the first spoken natural language input;
processing, using the ML model, the user profile data, the skill history data, and the input history data to determine a second semantic similarity between the second metadata and the first spoken natural language input;
determining, based at least in part on the first lexical similarity, the second lexical similarity, the first semantic similarity, and the second semantic similarity, that the at least first skill is to be used to respond to the first spoken natural language input; and
sending the NLU output data to the at least first skill, the at least first skill configured to process the NLU output data to determine first data responsive to the first spoken natural language input.

2. The computer-implemented method of claim 1, further comprising:
performing automatic speech recognition (ASR) processing on the audio data to generate first text data corresponding to the first spoken natural language input;
determining the first metadata includes second text data comprising at least one of a name of the at least first skill, a description of the at least first skill, a keyword associated with the at least first skill, or a sample natural language input for invoking the at least first skill; and
determining, using the search engine, the first lexical similarity between words in the first text data and words in the second text data.

3. The computer-implemented method of claim 1, further comprising:
determining, using a first feature extractor of the ML model, first vector data corresponding to at least one feature of the user profile data;
determining, using a second feature extractor of the ML model, second vector data representing at least one skill represented in the skill history data;
determining, using a third feature extractor of the ML model, third vector data representing at least one spoken natural language input represented in the input history data; and
processing the first vector data, the second vector data, and the third vector data using the ML model to determine the first semantic similarity and the second semantic similarity.

4. A computer-implemented method comprising:
receiving first data representing a first natural language input of a first user, the first natural language input corresponding to a first language;
determining profile data associated with the first user;
determining the profile data indicates the first language and a second language are understood by the first user;

determining, based at least in part on the profile data, a plurality of skills including a first skill corresponding to the first language and a second skill corresponding to the second language;

determining skill metadata corresponding to the plurality of skills;

determining, based at least in part on the skill metadata and the first data, that the second skill is to generate output data responsive to the first natural language input;

causing the second skill to generate the output data; and causing the output data to be presented to the first user.

5. The computer-implemented method of claim 4, further comprising:

determining skill history data associated with the profile data, the skill history data representing at least a third skill that previously executed;

determining input history data associated with the profile data, the input history data representing at least a second natural language input; and determining the second skill is to be used to generate the output data based at least in part on at least one of the skill history data or the input history data.

6. The computer-implemented method of claim 4, further comprising:

processing, using a search engine, the skill metadata with respect to the first data to determine a first set of skills from the plurality of skills;

processing, using a first machine learning (ML) model, the skill metadata with respect to the first data to determine a second set of skills from the plurality of skills; and determining the second skill is represented in at least one of the first set of skills or the second set of skills.

7. The computer-implemented method of claim 6, further comprising:

processing, using a second ML model, the first data to determine a plurality of skill categories; and determining the first set of skills corresponds to at least one of the plurality of skill categories.

8. The computer-implemented method of claim 6, further comprising:

determining skill history data associated with the profile data, the skill history data representing at least a third skill that previously executed;

determining input history data associated with the profile data, the input history data representing at least a second natural language input; and processing, using the first ML model, the profile data, the skill history data, and the input history data to determine the second set of skills.

9. The computer-implemented method of claim 8, further comprising:

determining, using a first feature extractor of the first ML model, first vector data corresponding to at least one feature of the profile data;

determining, using a second feature extractor of the first ML model, second vector data representing at least one skill represented in the skill history data;

determining, using a third feature extractor of the first ML model, third vector data representing at least one spoken natural language input represented in the input history data; and processing the first vector data, the second vector data, and the third vector data using the first ML model.

10. The computer-implemented method of claim 4, further comprising:

receiving second data representing a second natural language input corresponding to the first language;

determining the first skill is to respond to the second natural language input; and causing the first skill to determine third data responsive to the second natural language input.

11. The computer-implemented method of claim 4, further comprising:

determining skill history data associated with the profile data, the skill history data representing at least a third skill that previously executed;

determining input history data associated with the profile data, the input history data representing at least a second natural language input; and processing, using a machine learning (ML) model, the profile data, the skill history data, and the input history data to determine the second skill is to generate the output data.

12. The computer-implemented method of claim 11, further comprising:

determining second data representing the second natural language input;

determining the second natural language input is similar to the first natural language input;

determining the second skill was executed with respect to the second natural language input;

determining user feedback data associated with the second natural language input; and determining, based at least in part on the user feedback data, that the second skill is to generate the output data.

13. The computer-implemented method of claim 4, further comprising:

determining skill history data associated with the profile data;

determining input history data associated with the profile data; and processing, using a machine learning (ML) model, the profile data, the skill history data, and the input history data to determine the second skill is to generate the output data.

14. A computing system comprising:

at least one processor; and at least one memory comprising instructions that, when executed by the at least one processor, cause the computing system to:

receive first data representing a first natural language input of a first user, the first natural language input corresponding to a first language;

determine profile data associated with the first user;

determine the profile data indicates the first language and a second language are understood by the first user;

determine, based at least in part on the profile data, a plurality of skills, including a first skill corresponding to the first language and a second skill corresponding to the second language;

determine skill metadata associated with the plurality of skills;

determine, based at least in part on the skill metadata and the first data, that the second skill is to generate output data responsive to the first natural language input;

cause the second skill to generate the output data; and cause the output data to be presented to the first user.

15. The computing system of claim 14, wherein the at least one memory further comprises instructions that, when executed by the at least one processor, further cause the computing system to:
- determine skill history data associated with the profile data, the skill history data representing at least a third skill that previously executed;
- determine input history data associated with the profile data, the input history data representing at least a second natural language input; and
- determine the second skill is to be used to generate the output data based at least in part on at least one of the skill history data or the input history data.

16. The computing system of claim 14, wherein the at least one memory further comprises instructions that, when executed by the at least one processor, further cause the computing system to:
- process, using a search engine, the skill metadata with respect to the first data to determine a first set of skills from the plurality of skills;
- process, using a first machine learning (ML) model, the skill metadata with respect to the first data to determine a second set of skills from the plurality of skills; and
- determine the second skill is represented in at least one of the first set of skills or the second set of skills.

17. The computing system of claim 16, wherein the at least one memory further comprises instructions that, when executed by the at least one processor, further cause the computing system to:
- process, using a second ML model, the first data to determine a plurality of skill categories; and
- determine the first set of skills corresponds to at least one of the plurality of skill categories.

18. The computing system of claim 16, wherein the at least one memory further comprises instructions that, when executed by the at least one processor, further cause the computing system to:
- determine skill history data associated with the profile data, the skill history data representing at least a third skill that previously executed;
- determine input history data associated with the profile data, the input history data representing at least a second natural language input; and
- process, using the first ML model, the profile data, the skill history data, and the input history data to determine the second set of skills.

19. The computing system of claim 14, wherein the at least one memory further comprises instructions that, when executed by the at least one processor, further cause the computing system to:
- receive second data representing a second natural language input corresponding to the first language;
- determine the first skill is to respond to the second natural language input; and
- cause the first skill to determine third data responsive to the second natural language input.

20. The computing system of claim 14, wherein the at least one memory further comprises instructions that, when executed by the at least one processor, further cause the computing system to:
- determine skill history data associated with the profile data, the skill history data representing at least a third skill that previously executed;
- determine input history data associated with the profile data, the input history data representing at least a second natural language input; and
- process, using a machine learning (ML) model, the profile data, the skill history data, and the input history data to determine the second skill is to generate the output data.

21. The computing system of claim 20, wherein the at least one memory further comprises instructions that, when executed by the at least one processor, further cause the computing system to:
- determine second data representing the second natural language input;
- determine the second natural language input is similar to the first natural language input;
- determine the second skill was executed with respect to the second natural language input;
- determine user feedback data associated with the second natural language input; and
- determine, based at least in part on the user feedback data, that the second skill is to generate the output data.

* * * * *